US012227907B2

(12) United States Patent
Rule, Sr. et al.

(10) Patent No.: US 12,227,907 B2
(45) Date of Patent: Feb. 18, 2025

(54) MILLING TOOL

(71) Applicants: Jeffrey L. Rule, Sr., Ooltewah, TN (US); James R. Rule, Delaware, OH (US)

(72) Inventors: Jeffrey L. Rule, Sr., Ooltewah, TN (US); James R. Rule, Delaware, OH (US)

( * ) Notice: Subject to any disclaimer, the term of this patent is extended or adjusted under 35 U.S.C. 154(b) by 212 days.

(21) Appl. No.: 17/762,031

(22) PCT Filed: Mar. 3, 2022

(86) PCT No.: PCT/US2022/018807
§ 371 (c)(1),
(2) Date: Mar. 18, 2022

(87) PCT Pub. No.: WO2022/197457
PCT Pub. Date: Sep. 22, 2022

(65) Prior Publication Data

US 2023/0138956 A1 May 4, 2023

Related U.S. Application Data

(60) Provisional application No. 63/160,784, filed on Mar. 13, 2021.

(51) Int. Cl.

| | |
|---|---|
| ***E01C 23/088*** | (2006.01) |
| ***B28D 1/18*** | (2006.01) |
| ***E01C 23/12*** | (2006.01) |
| ***E21C 35/19*** | (2006.01) |
| ***E21C 35/193*** | (2006.01) |

(52) U.S. Cl.
CPC ............ *E01C 23/088* (2013.01); *B28D 1/188* (2013.01); *E01C 23/127* (2013.01); *E21C 35/191* (2020.05); *E21C 35/1933* (2013.01)

(58) Field of Classification Search
CPC ...... E01C 21/00; E01C 23/065; E01C 23/088; E01C 23/127; B28D 1/188; E21C 35/19; E21C 35/191; E21C 35/1933; E21C 35/1936; E21C 35/197; E21C 35/188
See application file for complete search history.

(56) References Cited

U.S. PATENT DOCUMENTS 2,916,275 A * 12/1959 Bruestle .................. E21C 35/19 299/109
3,865,437 A * 2/1975 Crosby ................. E21C 35/197 403/165
4,084,856 A * 4/1978 Emmerich ............ E21C 35/197 175/354

(Continued)

*Primary Examiner* — Janine M Kreck
*Assistant Examiner* — Michael A Goodwin
(74) *Attorney, Agent, or Firm* — Shane Cortesi

(57) ABSTRACT

An improved sleeve for securing a milling bit to a milling tool base is described. The base may include a lower portion that mates to a surface milling drum and an upper portion with a borehole that accepts the sleeve. The sleeve may include a deflectable rear portion that may include slot tails. When inserting the sleeve into the front of the borehole, the slot tails on the rear of the sleeve may deflect inwardly. The slot tails may then at least partially return to their resting position as they exit the rear of the borehole to lock the sleeve into place. The sleeve may hold a milling bit.

5 Claims, 18 Drawing Sheets

(56) References Cited

U.S. PATENT DOCUMENTS

| | | | | |
|---|---|---|---|---|
| 6,357,832 | B1 * | 3/2002 | Sollami | E21C 35/183 299/106 |
| 6,371,567 | B1 | 4/2002 | Sollami | |
| 7,789,468 | B2 * | 9/2010 | Sollami | E21C 35/18 299/102 |
| 7,997,660 | B2 * | 8/2011 | Monyak | E21C 35/197 299/107 |
| 8,118,371 | B2 * | 2/2012 | Hall | E21C 35/1933 299/102 |
| 8,201,893 | B1 | 6/2012 | Sollami | |
| 8,540,320 | B2 | 9/2013 | Sollami | |
| 8,622,483 | B2 | 1/2014 | Sollami | |
| 9,103,079 | B2 | 8/2015 | Sollami | |
| 9,879,531 | B2 | 1/2018 | Sollami | |
| 10,072,501 | B2 | 9/2018 | Sollami | |
| 10,337,324 | B2 | 7/2019 | Sollami | |
| 10,370,966 | B1 | 8/2019 | Sollam | |
| 10,385,689 | B1 | 8/2019 | Sollami | |
| 10,502,056 | B2 | 12/2019 | Sollam | |
| 10,577,931 | B2 | 3/2020 | Sollam | |
| 10,598,013 | B2 | 3/2020 | Sollami | |
| 10,633,971 | B2 | 4/2020 | Sollami | |
| 10,683,752 | B2 | 6/2020 | Sollami | |
| 10,900,355 | B2 | 1/2021 | Sollami | |
| 11,168,563 | B1 | 11/2021 | Sollami | |
| 11,261,731 | B1 * | 3/2022 | Sollami | E21C 35/188 |
| 2002/0074851 | A1 * | 6/2002 | Montgomery, Jr. | E21C 35/197 299/2 |
| 2008/0036272 | A1 * | 2/2008 | Hall | E21C 35/197 299/105 |
| 2011/0089747 | A1 * | 4/2011 | Helsel | B28D 1/188 403/409.1 |
| 2014/0339882 | A1 * | 11/2014 | Hall | B28D 1/188 299/79.1 |
| 2019/0242254 | A1 * | 8/2019 | Sollami | E21C 35/19 |

* cited by examiner

MILLING TOOL

BACKGROUND

Technical Field

The present invention generally relates to milling machinery.

Background of the Invention

As known to those of ordinary skill and described in U.S. Pat. No. 9,103,079, a milling machine may be used as a soil stabilizer to cut, mix, and pulverize native in-place soils with additives or aggregates to modify and stabilize the soil for a strong base. A milling machine may also be used as a road reclaimer to pulverize a surface layer, such as asphalt, and can mix it with an underlying base to create a new road surface and stabilize deteriorated roadways.

Milling tools comprising a base and a sleeve are widely known in the road construction industry. Commonly, these milling tools have a sleeve (also known as a bit holder) that secures press fit into a bore in a base. For example, U.S. Pat. No. 10,598,013 (the '013 patent), the entire contents of which are incorporated herein by reference, teaches a bit holder that is interference or press fit into a base opening. In particular, a slot in the bit holder shank allows the shank to radially compress to fit into the base opening. The bit holder, in turn, secures a diamond, tungsten carbide, or other bit. The system of the '013 patent suffers from several disadvantages, however. For example, the bit holder head may become misaligned with the opening. Further, it may be difficult or unsafe to install the bit holder into the base with this design, and the bit holder may become loose over time. In addition, the side of the head opposite the slot may become plastically deformed.

It would be advantageous to provide milling tools that have increased durability, holding power and ease of installation. For example, unlike the sleeve of the '013 patent, the rear ends of the sleeves of the preferred embodiments of the invention include flanges and deflect inward as the sleeves enter the base opening and then relax (radially expand) after they pass rearwardly beyond the rear end of the base opening, which allows the sleeve to lock more firmly into place.

BRIEF DESCRIPTION OF THE DRAWINGS

in FIG. 5, the sleeve is removed from the base.

in FIG. 6, the sleeve is removed from the base.

in FIG. 9, bits are located in the generally cylindrical shanks of the sleeves.

in FIG. 16, the sleeve is removed from the base.

in FIG. 17, the sleeve is removed from the base.

in FIG. 18, the sleeve is removed from the base.

in FIG. 19, the sleeve is removed from the base.

SUMMARY OF INVENTION

Figure 1:
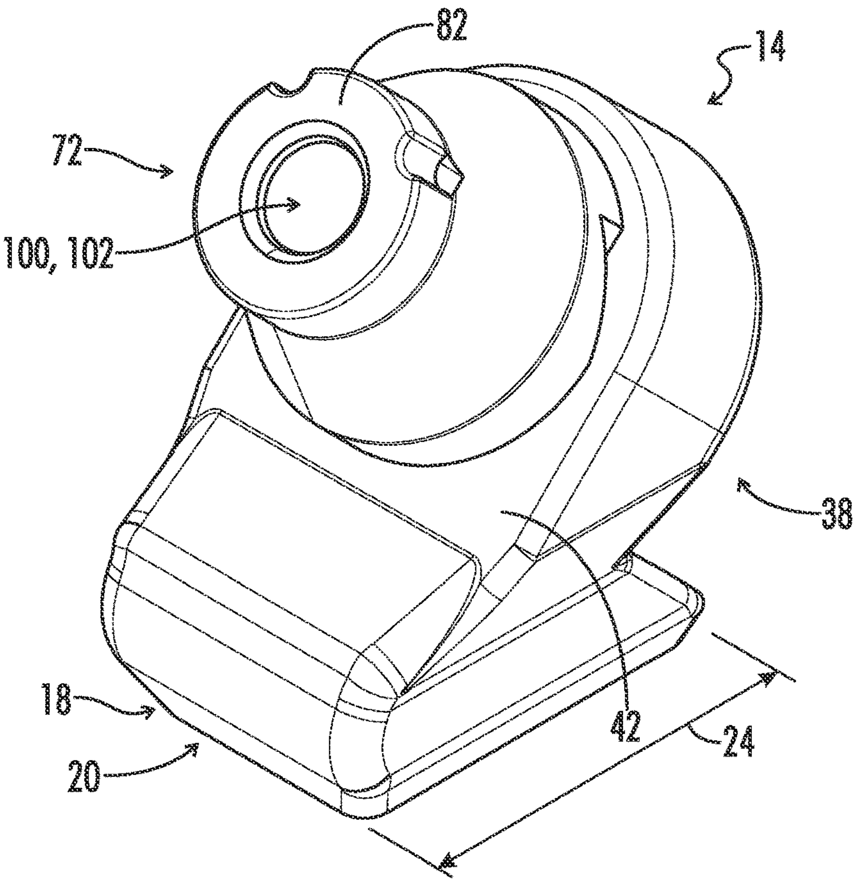
FIG. 1 illustrates a front top side perspective view of a milling tool of one embodiment of the present invention.
Figure 2:
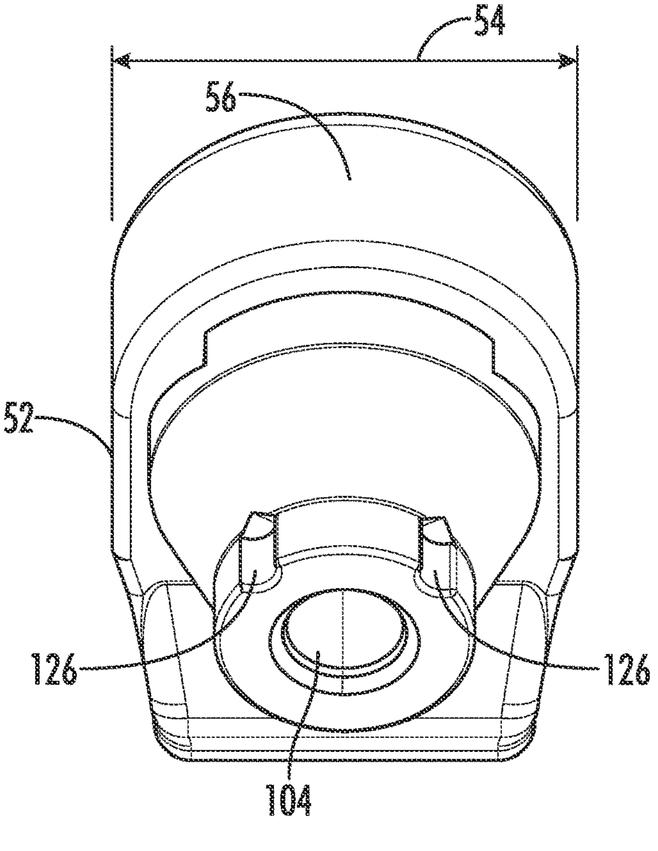
FIG. 2 illustrates a top plan view of the milling tool of FIG. 1.

In some embodiments, the present disclosure provides a method for milling a surface that includes one or more of the following steps: a) providing a base that may include i) a base lower portion that may include a front, a rear, a length extending from the front to the rear, and/or a width extending perpendicular to the length; and ii) a base upper portion that may extend from the base lower portion and may include a front comprising a front face, a rear comprising a rear face, a length extending from the front to the rear and parallel to the base lower portion length, a width parallel to the base lower portion width, and/or an interior wall that may form a base upper portion opening extending through the base upper portion from the front face to the rear face, the base upper portion opening optionally comprising a front adjacent the front face, a rear adjacent the rear face, and/or an inner diameter extending across the base upper portion opening; b) providing a sleeve that may include i) a head that may have a front end, a rear end, a length extending from the front end to the rear end, a head diameter, and/or an exterior surface; ii) a shank that may extend rearwardly from the head rear end, the shank optionally comprising a shank front end adjacent to the head rear end, a shank rear end, a length extending from the shank front end to the shank rear end, an outer diameter, an exterior surface, and/or a deflectable rear section located at the shank rear end, the deflectable rear section optionally comprising one or more slots, the one or more slots optionally having a slot front end, a slot rear end located at the shank rear end, and a length extending from the slot front end to the slot rear end; iii) a hole that may pass through the head and shank of the sleeve to form a hollow sleeve interior, the hollow sleeve interior optionally comprising a sleeve interior surface and a sleeve inner diameter; optionally, the sleeve shank is configured to be removably inserted into the base upper portion opening; optionally, the deflectable rear section is configured to deflect inwardly from a relaxed position to a constricted position as the rear end of the sleeve shank is inserted into the front end of the base upper portion opening; optionally, the deflectable rear section is configured to move outwardly and at least partially (i.e., partially or fully) return to the relaxed position after the rear end of the sleeve shank exits the rear end of the base upper portion opening; c) securing the sleeve shank to the base by optionally inserting/passing the rear end of the sleeve shank into the front end of the base upper portion opening and then out the rear end of the base upper portion opening (i.e., moving the rear end of the sleeve shank rearwardly through the base upper portion opening), optionally, the deflectable rear section moves from the relaxed position to the constricted position as the rear end of the sleeve shank is inserted into the front end of the base upper portion opening, and optionally, the deflectable rear section at least partially returns to the relaxed position as the rear end of the sleeve shank exits the rear end of the base upper portion opening; d) securing a milling bit to the sleeve by optionally inserting the milling bit into the sleeve hole; and e) optionally rotating the base (and the sleeve shank and the milling bit secured to the base), on a drum of a milling machine. Optionally, prior to step e), the base has been secured to the exterior surface of the drum by a riser block having a top surface and a bottom surface. More particularly, optionally, the riser block bottom surface has been welded to the exterior surface of the drum, and the lower portion of the base has been welded to the riser block top surface. The method may be performed in any suitable order. For example, optionally, in an exemplary sequence, the riser block bottom surface is welded to the drum exterior surface, then the base lower portion is welded to the riser block top surface, then the sleeve is secured to the base by positioning the shank through the base upper portion opening and then the milling bit is positioned into the sleeve hole.

Optionally, the drum is moving along a surface and the milling bit is milling the surface during step e). Optionally, a plurality of milling tools can be secured to the drum by repeating steps a)-d) a plurality of times (so that the drum comprises a plurality of bases, sleeves, and milling bits).

Optionally, the deflectable rear section comprises a flange, the flange protruding outwardly as compared to a section of the shank immediately forward of the flange, and further wherein when the deflectable rear section at least partially returns to the relaxed position (i.e., at the conclusion of step c)), the flange is located rearwardly relative to the base upper portion opening. Optionally, the flange extends at least partially around a circumference of the deflectable rear section. Optionally, the plurality of slots interrupts the flange, and, except for where the plurality of slots interrupt the flange, the flange forms a rim and extends completely around a circumference of the deflectable rear section. Optionally, the sleeve shank outer diameter at the flange is greater than the inner diameter of the base upper portion opening at the base upper portion opening rear. Optionally, the flange is configured to engage the base upper portion rear face and inhibits the rear end of the sleeve shank from moving through the base upper portion opening rear. Optionally, the sleeve shank rear end/a rearward portion of the sleeve shank is indented.

Optionally, when the deflectable rear section at least partially returns to the relaxed position (i.e., at the conclusion of step c)), the sleeve head is located in front of the base upper portion opening front and there is a space/gap between the sleeve head rear end and the base upper portion front face (i.e., the sleeve head rear end does not abut the base upper portion front face when the sleeve is installed). Optionally, the space/gap is configured to allow the sleeve head rear end to move toward and/or away from the base upper portion front face when the milling tool is milling a surface. Optionally, the sleeve head is conical in shape.

Optionally, the at least one slot comprises a plurality of slots, wherein the deflectable rear section comprises a plurality of deflectable slot tails separated by the plurality of slots, and further wherein each slot tail comprises a portion of the flange and further wherein each slot tail has a free rear end. Optionally, the plurality of slots extends from the shank exterior surface to the sleeve interior surface. Optionally, the plurality of slots is arch-shaped. Optionally, the plurality of slots has a width parallel to the outer diameter, and the slot width increases at the rear end of the shank. Optionally, the plurality of slots comprises at least two slots.

Optionally, the sleeve head comprises a plurality of indentations spaced about a perimeter of the sleeve head, the plurality of indentations extending from the front face of the sleeve head rearwardly. Optionally, the sleeve is removed from the base upper portion opening by placing a sleeve removal tool (e.g., a wedge-type fork) between the sleeve head and base upper portion front. Optionally, the plurality of indentations is semi-cylindrical in shape. Optionally, the sleeve head diameter is greater than the outer diameter of the portion of the sleeve shank located forwardly relative to the plurality of slots.

In some embodiments, the base lower portion bottom comprises a fastener aperture and the base is secured to the drum by placing a fastener through the fastener aperture and into the drum prior to step e). Optionally, the base lower portion bottom is flat. Optionally, the base upper portion front face and head rear face are flat. Optionally, the base upper portion rear face is flat. Optionally, the inner diameter of the base upper portion opening varies in size. Optionally, the inner diameter of the base upper portion opening is largest at the base upper portion front end. Optionally, the base upper portion opening comprises a tapered front section in which the inner diameter of the base upper portion opening tapers in decreasing size rearwardly from the base upper portion opening front. Optionally, the base upper portion opening comprises a tapered rear section in which the inner diameter of the base upper portion opening tapers in decreasing size forwardly from the base upper portion opening rear. Optionally, the base upper portion inner diameter is larger at the tapered front and rear sections than the area between the tapered front and rear sections.

In some embodiments, the base upper portion extends upward from the base lower portion top at an angle between 1 and 90 degrees.

In some embodiments, the base, sleeve shank, and milling bit are comprised of metal. Optionally, the bit comprises a diamond or tungsten carbide tip. Optionally, the sleeve is comprised of cold-forged steel.

In some embodiments, the sleeve shank and opening are cylindrical in shape.

In still further embodiments, the present disclosure provides a method for milling a surface that includes one or more of the following steps: a) providing a base that may include a base opening comprising a front adjacent the front face, a rear adjacent the rear face, and an inner diameter extending across the base opening; b) providing a sleeve that may include: i) a head that may have a front end, a rear end, a length extending from the front end to the rear end, a head diameter, and an exterior surface; ii) a shank that may extend rearwardly from the head rear end and may include a shank front end adjacent to the head rear end, a shank rear end, a length extending from the shank front end to the shank rear end, an outer diameter, an exterior surface, and a deflectable rear section that may be located at the shank rear end and may include one or more slots that may have a slot front end, a slot rear end located at the shank rear end, and a length extending from the slot front end to the slot rear end; and/or iii) a hole that may pass through the head and shank of the sleeve to form a hollow sleeve interior that may include a sleeve interior surface and a sleeve inner diameter. Optionally, the sleeve shank is configured to be removably inserted into the base opening. Optionally, the deflectable rear section is configured to deflect inwardly from a relaxed position to a constricted position as the rear end of the sleeve shank is inserted into the front end of the base opening. Optionally, the deflectable rear section is configured to move outwardly and at least partially return to the relaxed position after the rear end of the sleeve shank exits the rear end of the base opening. Optionally, the method further includes c) securing the sleeve shank to the base by inserting/passing the rear end of the sleeve shank into the front end of the opening and then out the rear end of the base opening optionally so that the deflectable rear section moves from the relaxed position to the constricted position as the rear end of the sleeve shank is inserted into the front end of the base opening, and optionally so that the deflectable rear section at least partially returns to the relaxed position as the rear end of the sleeve shank exits the rear end of the base opening. Optionally, the method further includes d) securing a milling bit to the sleeve by inserting the milling bit into the sleeve hole. Optionally, the method further includes e) rotating the base, and the sleeve shank and the milling bit secured to the base, on a drum of a milling machine. In addition, the base, sleeve, milling bit, drum and method may include one or more features and additional steps described above.

DETAILED DESCRIPTION

With reference to FIGS. 1-28B, the present invention provides milling tools as described herein. FIGS. 1-28B are CAD drawings drawn to scale. However, other dimensions are possible.

Figure 9:
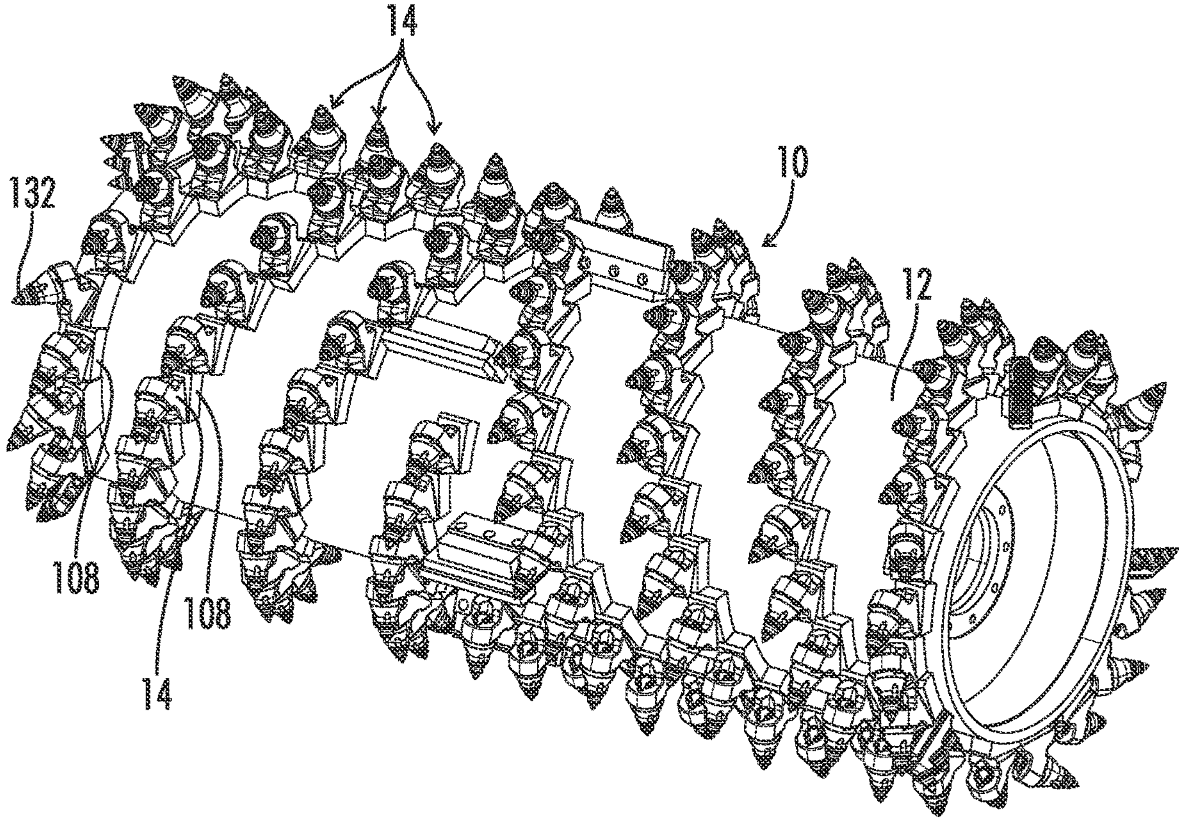
FIG. 9 illustrates a top front side perspective view of a milling machine drum equipped with a plurality of the milling tools of FIG. 1.
Figure 10:
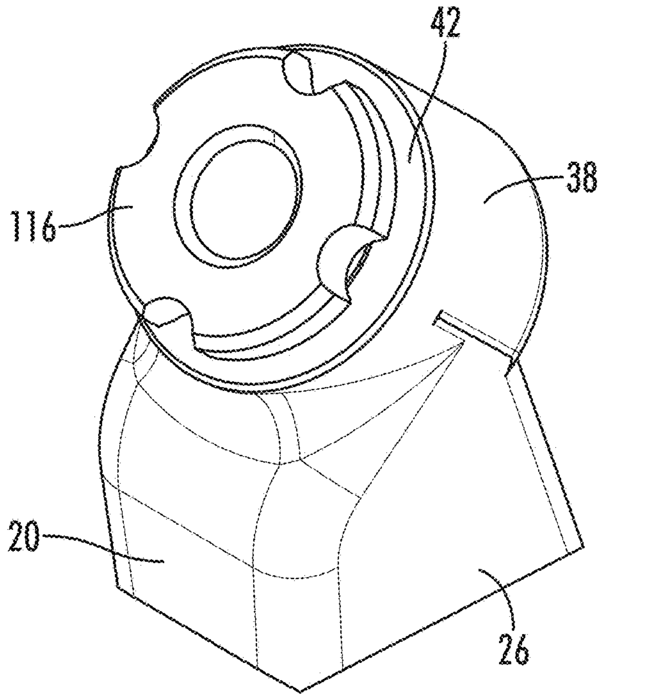
FIG. 10 illustrates a front top side perspective view of a milling tool of one embodiment of the present invention.
Figure 11:
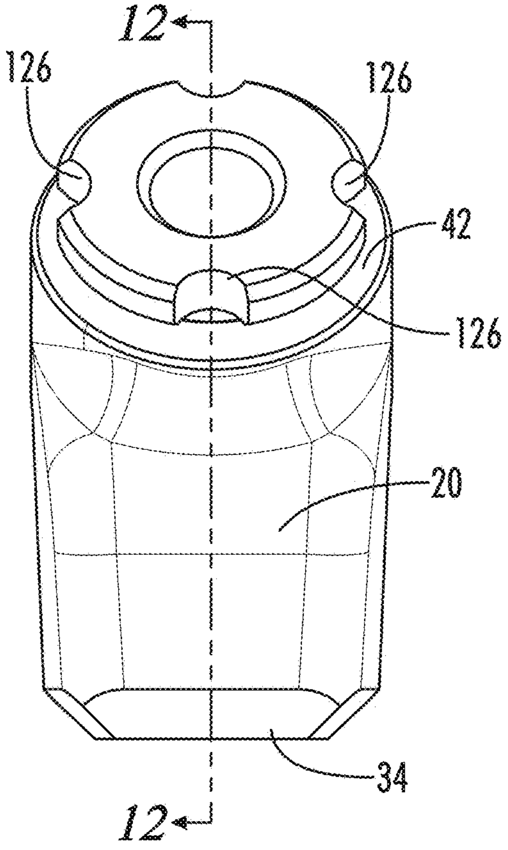
FIG. 11 illustrates a front elevation view of the milling tool of FIG. 10.

Referring further to FIGS. 1-28B, in some embodiments, the present invention relates to bit mounting assemblies 14 that may include a base 16, a sleeve 70 secured to the base 16, and a milling bit 132 secured to the sleeve 70. As shown in FIG. 9, the bit mounting assemblies 14 may be mounted to the drums 10 of a milling machine. More particularly, optionally, in use milling a road or soil, as best seen in FIG. 9, a plurality of bit mounting assemblies 14 (each with an associated base 16, sleeve 70 and milling bit 132) arranged in a helical pattern may be mounted around the exterior of a drum 10 of a milling machine. The milling machine may roll the drum 10 along a surface (e.g., soil or a road) so that the milling bit 132 mills the surface.

The base 16 may include a lower portion 18 comprising a front 20, a rear 22, a length 24 extending from the front 20 to the rear 22, a left side 26, a right side 28, a width 30 extending from the left side 26 to the right side 28 and perpendicular to the length 24, a top 32, a bottom 34, and a height 36 extending from the top 32 to the bottom 34 and perpendicular to the length 24 and the width 30. The base 16 may further include an upper portion 38 that may extend from the base lower portion top 32 at an angle of, for example, between 1 and 90 degrees and may include a front 40 comprising a front face 42 that is generally flat, a rear 44 comprising a rear face 46 that is generally flat, a length 48 extending from the front 40 to the rear 44 and parallel to the base lower portion length 24, a left side 50, a right side 52, a width 54 extending from the left side 50 to the right side 52 and parallel to the base lower portion width 30, a top 56, a bottom 58, and a height 60 extending from the top 56 to the bottom 58 and parallel to the base lower portion height 36, and an interior wall 62 forming an opening 64 that receives the sleeve 70. The base upper portion opening 64 may extend through the base upper portion 38 from the front face 42 to the rear face 46. As noted above and shown in FIGS. 1-28B, the base upper portion 38 (including the front face 42 and rear face 46 and opening 64) may be angled relative to the base lower portion bottom 34

Figure 6:
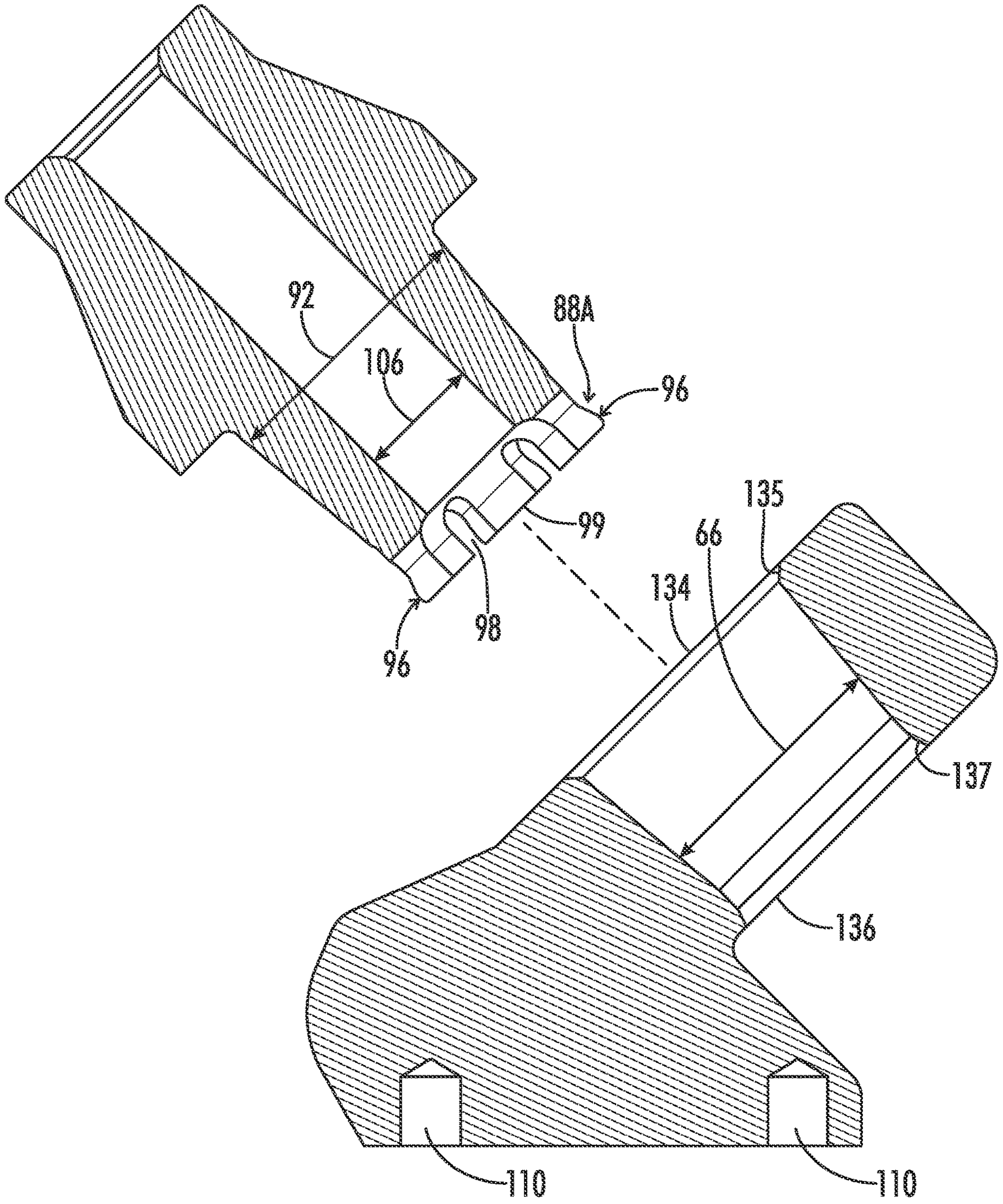
FIG. 6 illustrates a side plan cross sectional view of the milling tool of FIG. 1.
Figure 7:
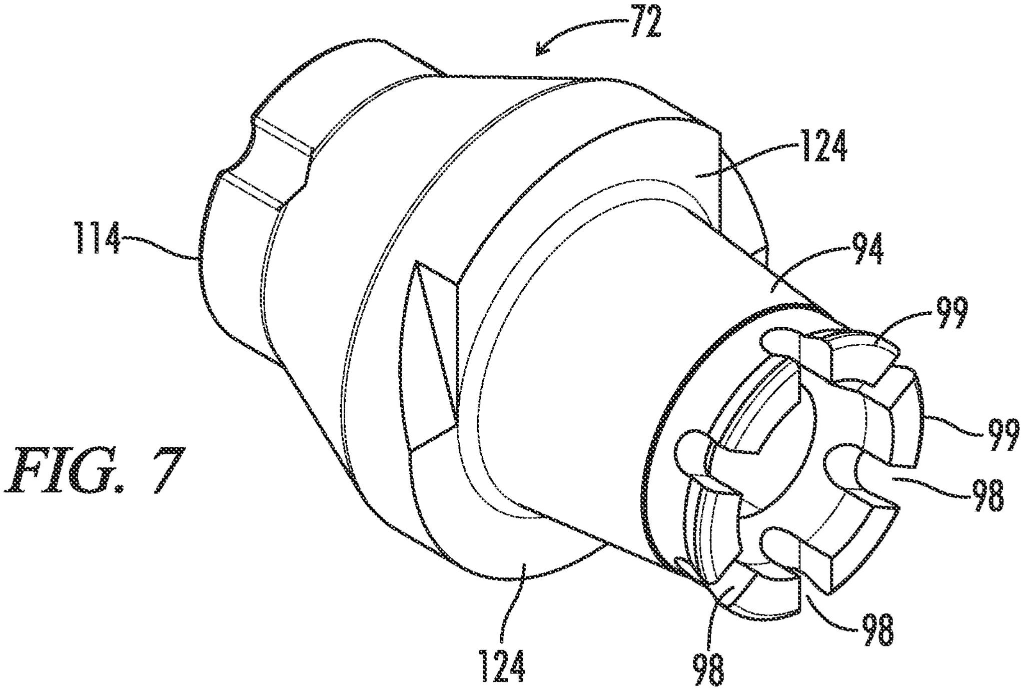
FIG. 7 illustrates a rear top side perspective view of the sleeve of the milling tool of FIG. 1.
Figure 8:
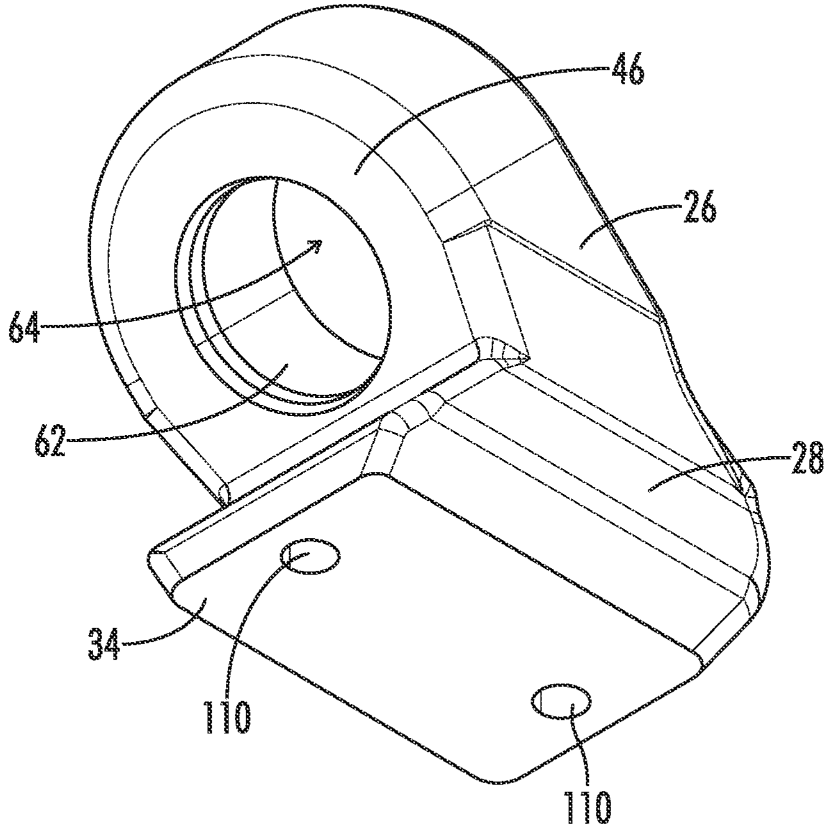
FIG. 8 illustrates a rear bottom side perspective view of the base of the milling tool of FIG. 1.
Figure 18:
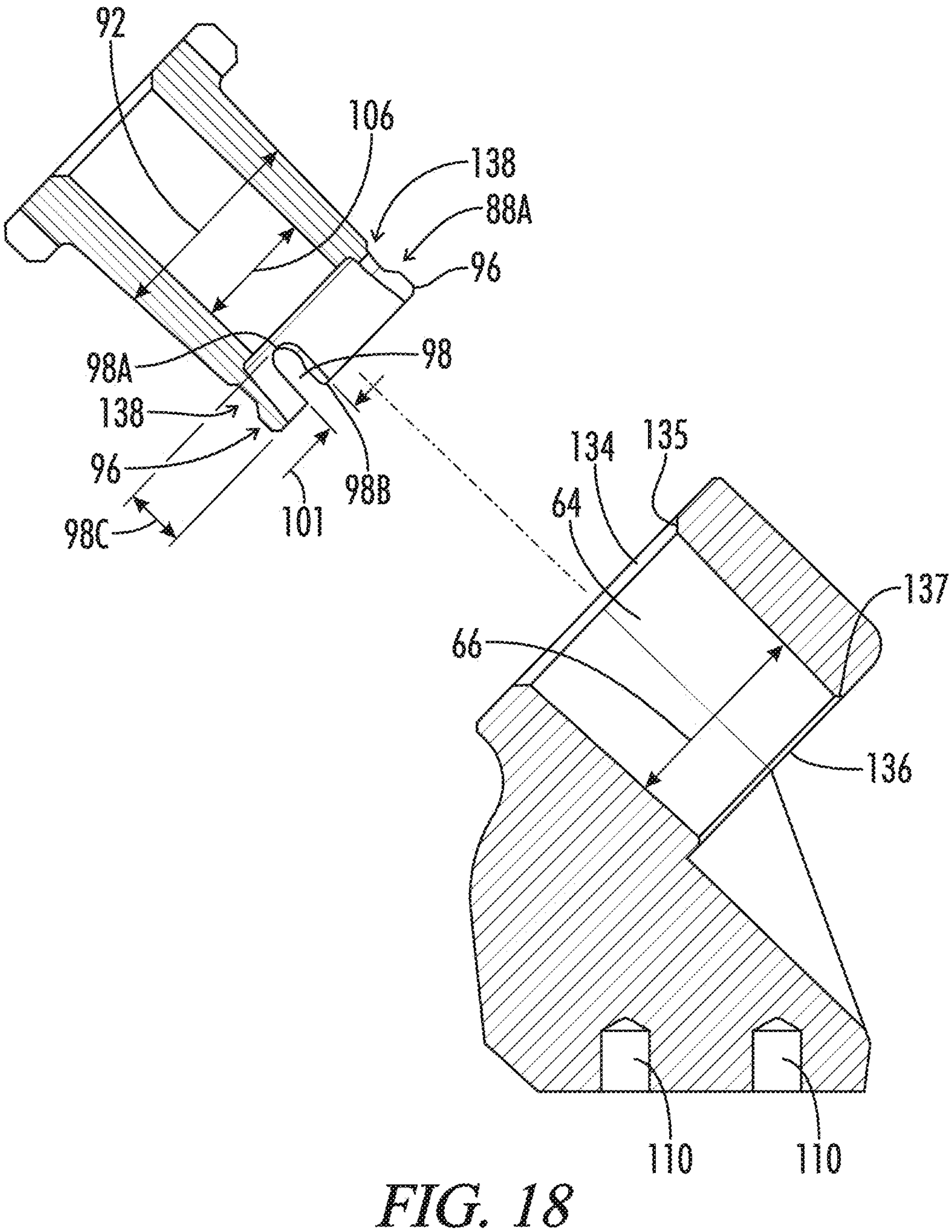
FIG. 18 illustrates a side plan cross sectional view of the milling tool of FIG. 10.
Figure 19:
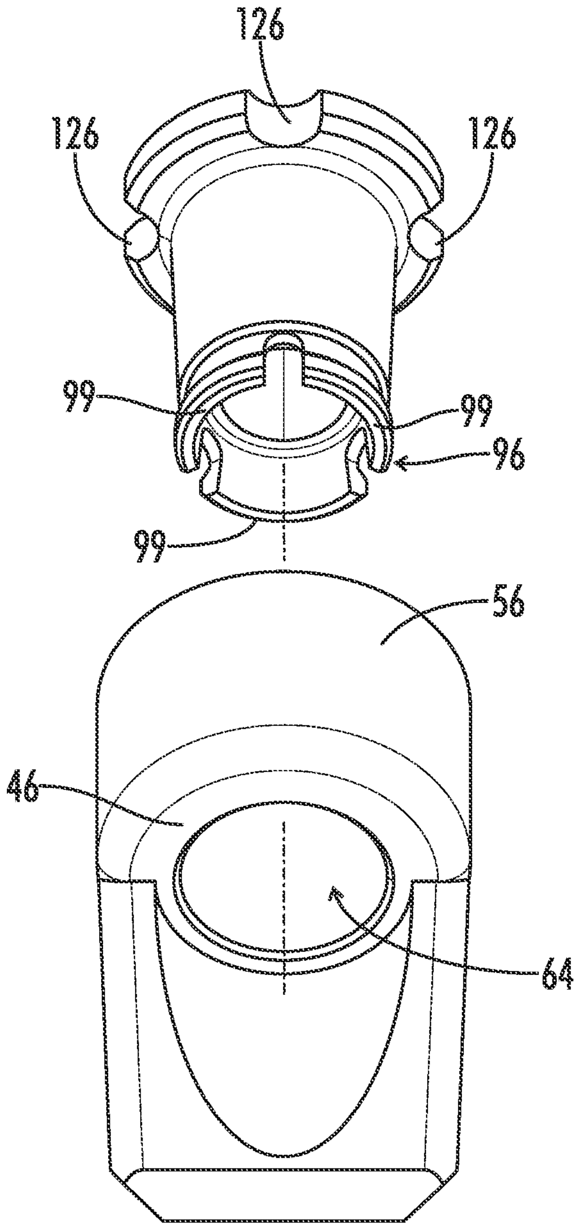
FIG. 19 illustrates a rear elevation view of the milling tool of FIG. 10.
Figure 20:
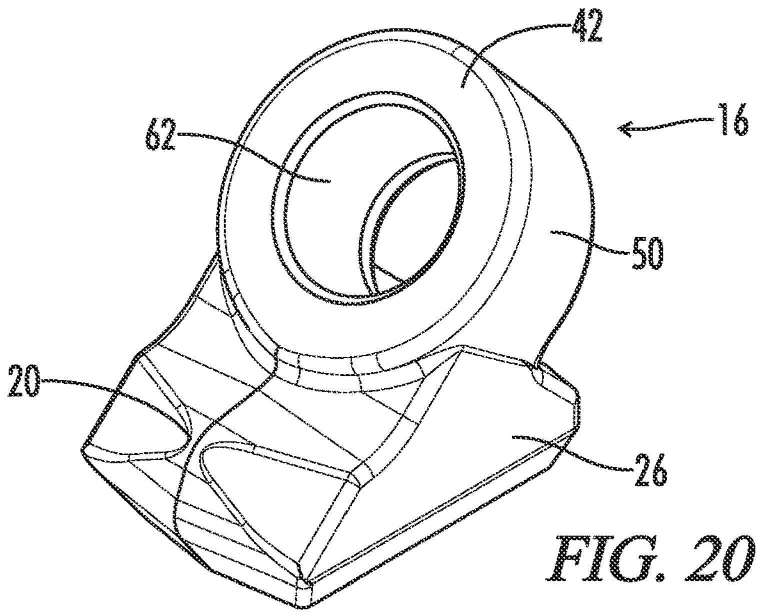
FIG. 20 illustrates a front top side perspective view of a milling tool of one embodiment of the present invention.
Figure 21:
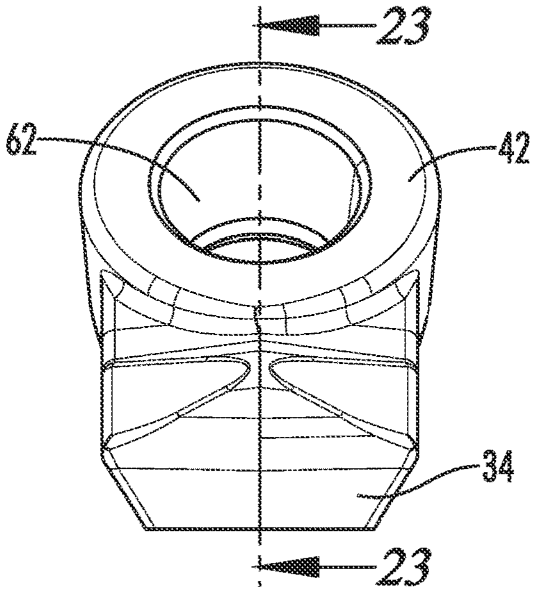
FIG. 21 illustrates a front elevation view of the milling tool of FIG. 20.
Figure 22:
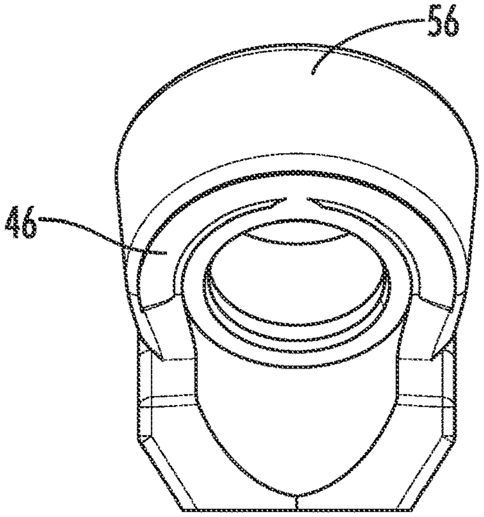
FIG. 22 illustrates a rear elevation view of the milling tool of FIG. 20.
Figure 23:
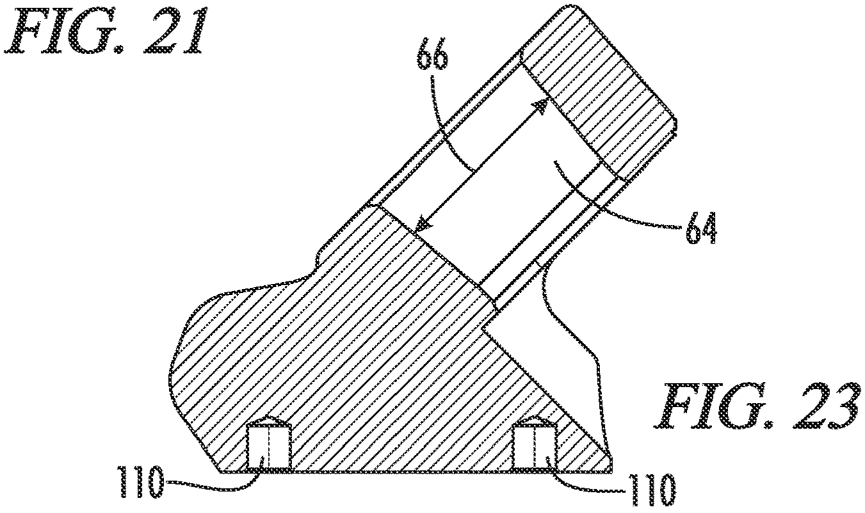
FIG. 23 illustrates a side plan cross sectional view of the milling tool of FIG. 20.
Figure 24A:
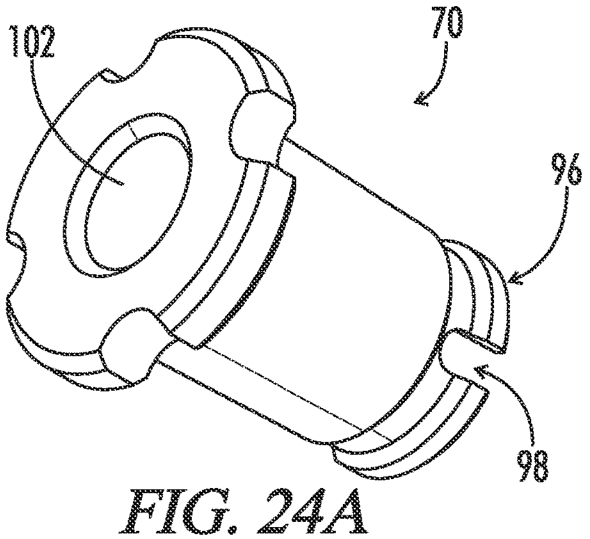
FIG. 24A illustrates a front bottom side perspective view of a milling tool sleeve of one embodiment of the present invention.
Figure 24B:
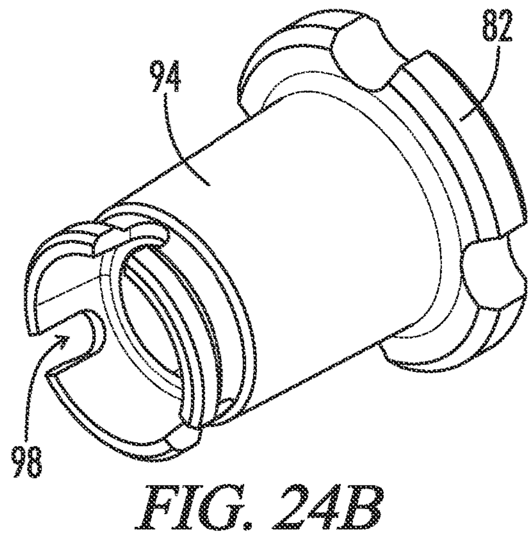
FIG. 24B illustrates a rear top side perspective view of the milling tool sleeve of FIG. 24A.
Figure 24C:
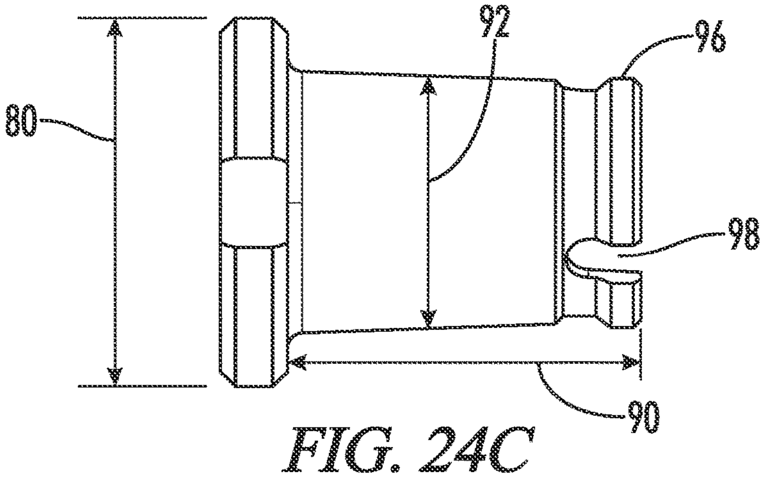
FIG. 24C illustrates a side plan view of the milling tool sleeve of FIG. 24A.
Figure 24D:
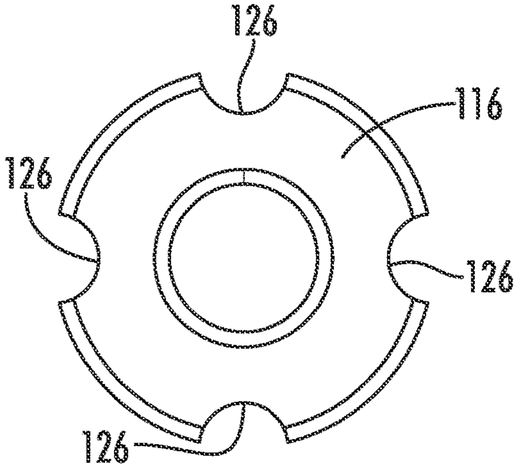
FIG. 24D illustrates a front plan view of the milling tool sleeve of FIG. 24A.
Figure 24E:
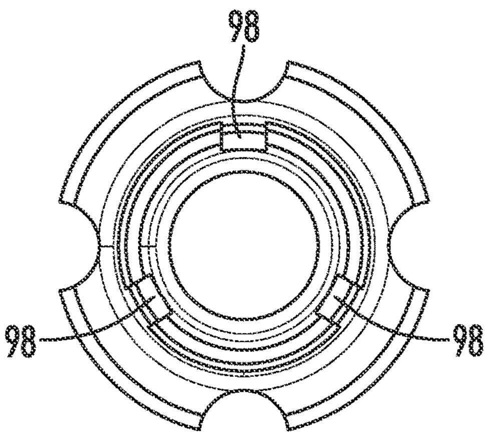
FIG. 24E illustrates a rear plan view of the milling tool sleeve of FIG. 24A.
Figure 25A:
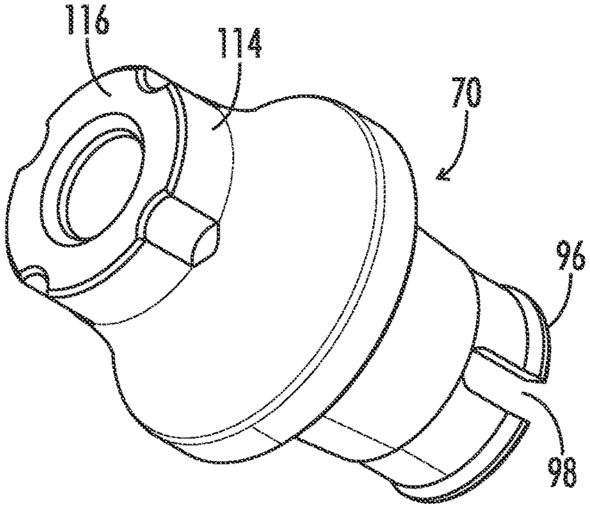
FIG. 25A illustrates a front bottom side perspective view of a milling tool sleeve of one embodiment of the present invention.
Figure 25B:
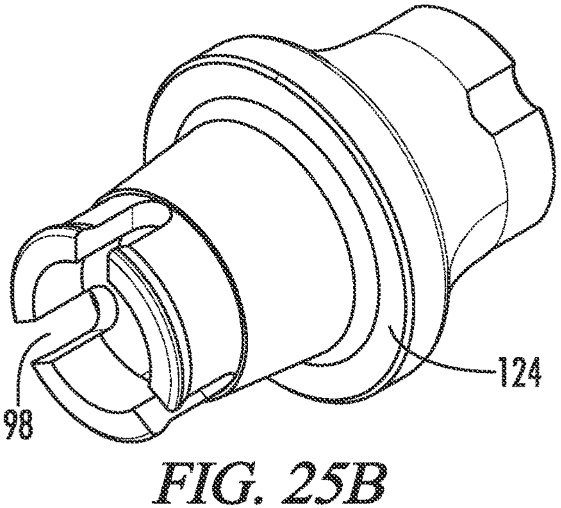
FIG. 25B illustrates a rear top side perspective view of the milling tool sleeve of FIG. 25A.
Figure 25C:
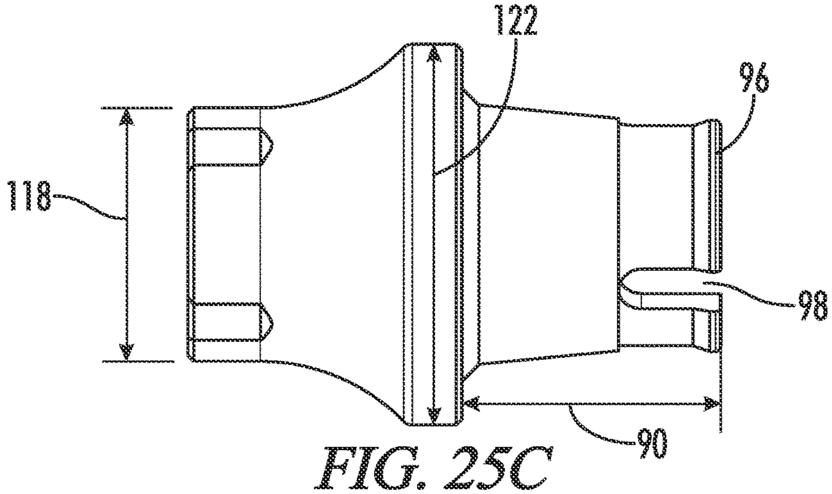
FIG. 25C illustrates a side plan view of the milling tool sleeve of FIG. 25A.
Figure 25D:
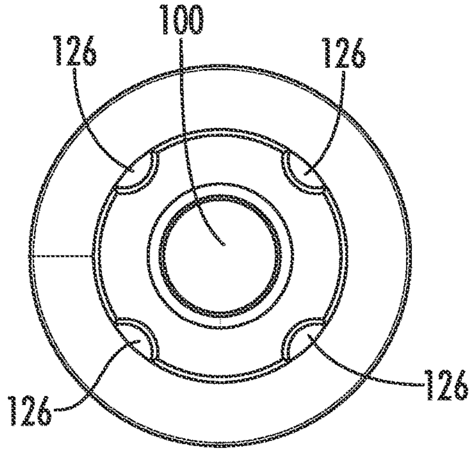
FIG. 25D illustrates a front plan view of the milling tool sleeve of FIG. 25A.
Figure 25E:
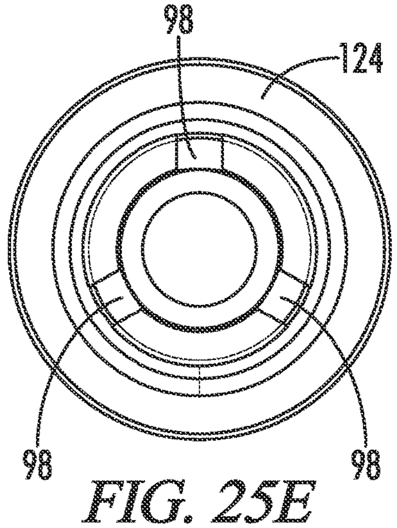
FIG. 25E illustrates a rear plan view of the milling tool sleeve of FIG. 25A.
Figure 26A:
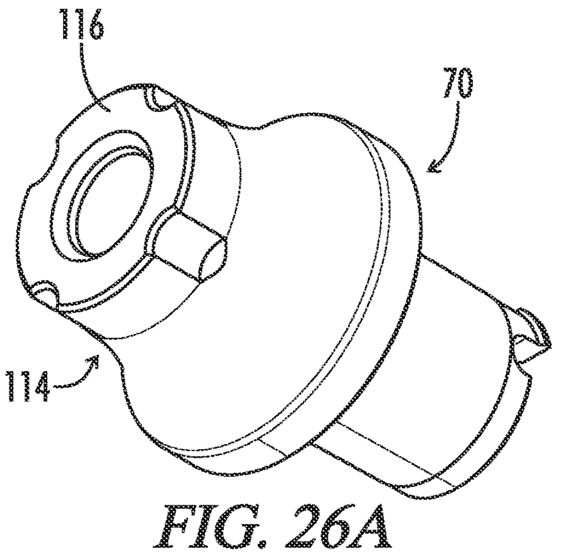
FIG. 26A illustrates a front bottom side perspective view of a milling tool sleeve of one embodiment of the present invention.
Figure 26B:
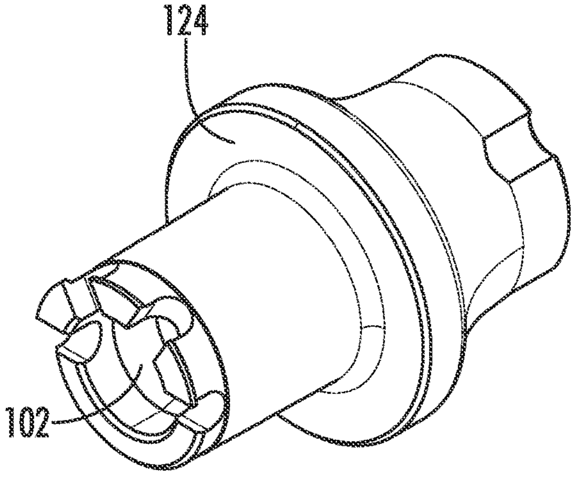
FIG. 26B illustrates a rear top side perspective view of the milling tool sleeve of FIG. 26A.
Figure 26C:
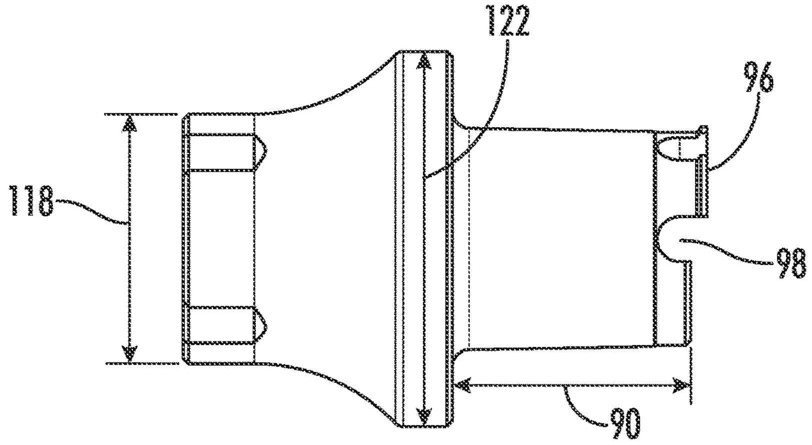
FIG. 26C illustrates a side plan view of the milling tool sleeve of FIG. 26A.
Figure 26D:
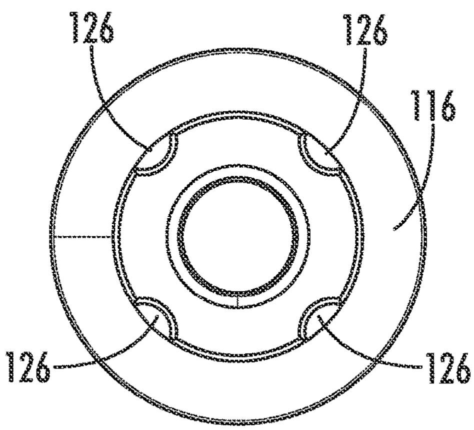
FIG. 26D illustrates a front plan view of the milling tool sleeve of FIG. 26A.
Figure 26E:
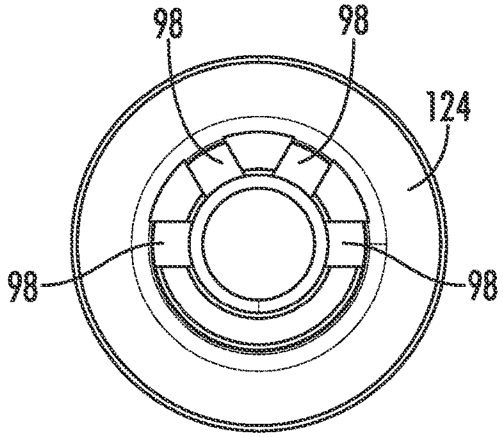
FIG. 26E illustrates a rear plan view of the milling tool sleeve of FIG. 26A.
Figure 27A:
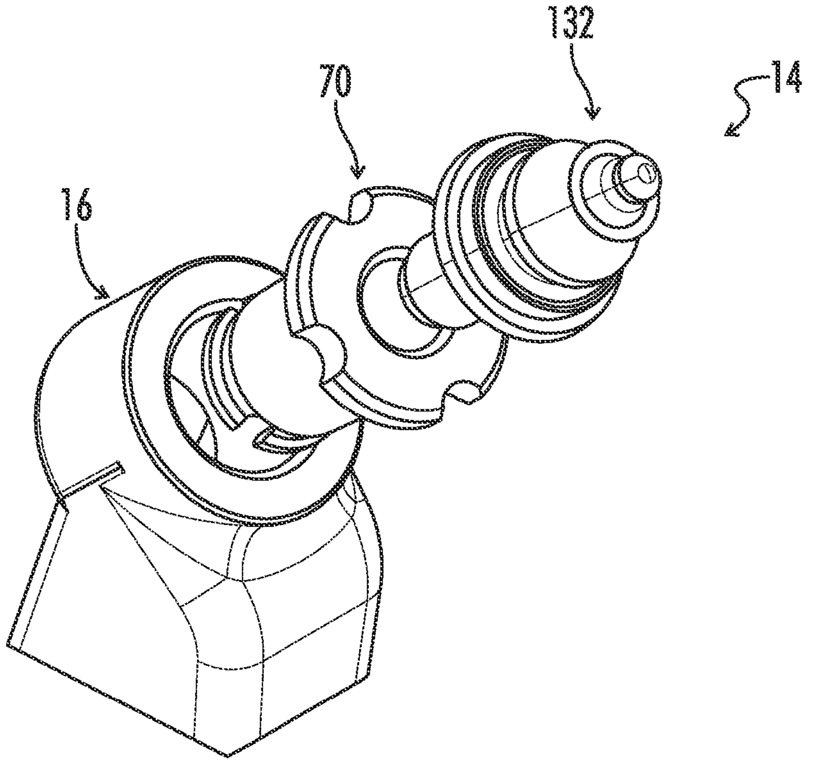
FIG. 27A illustrates an exploded perspective view of the milling tool of FIG. 10 and a bit.
Figure 27B:
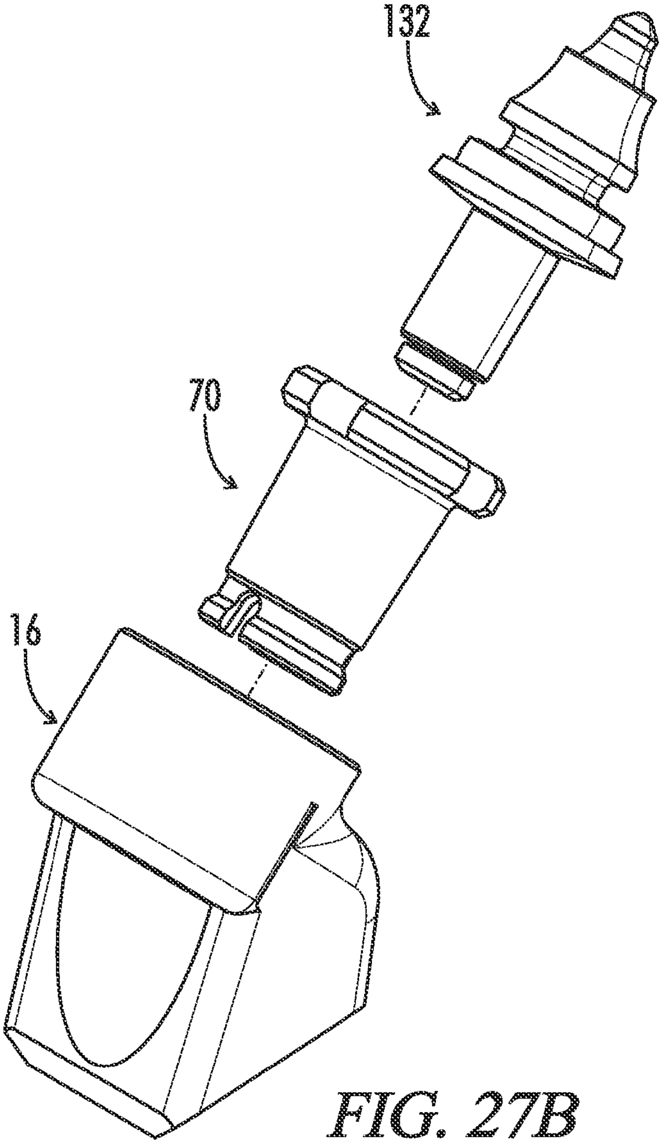
FIG. 27B illustrates an exploded perspective view of the milling tool of FIG. 10 and a bit.
Figure 28A:
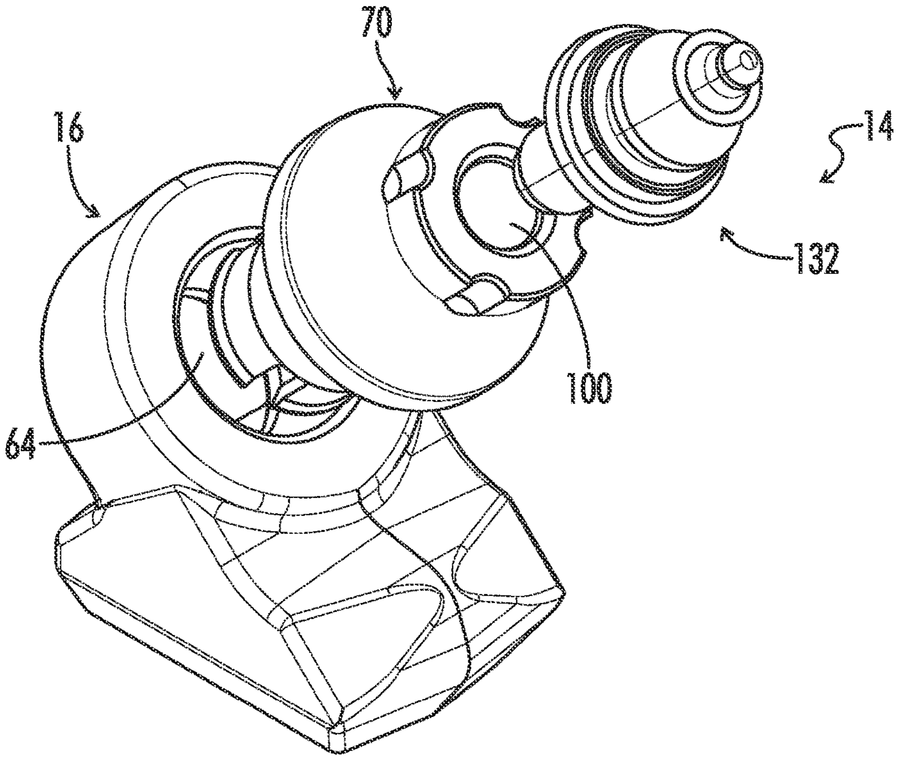
FIG. 28A illustrates an exploded perspective view of the base of FIG. 20 and the sleeve of FIG. 25A and a bit.
Figure 28B:
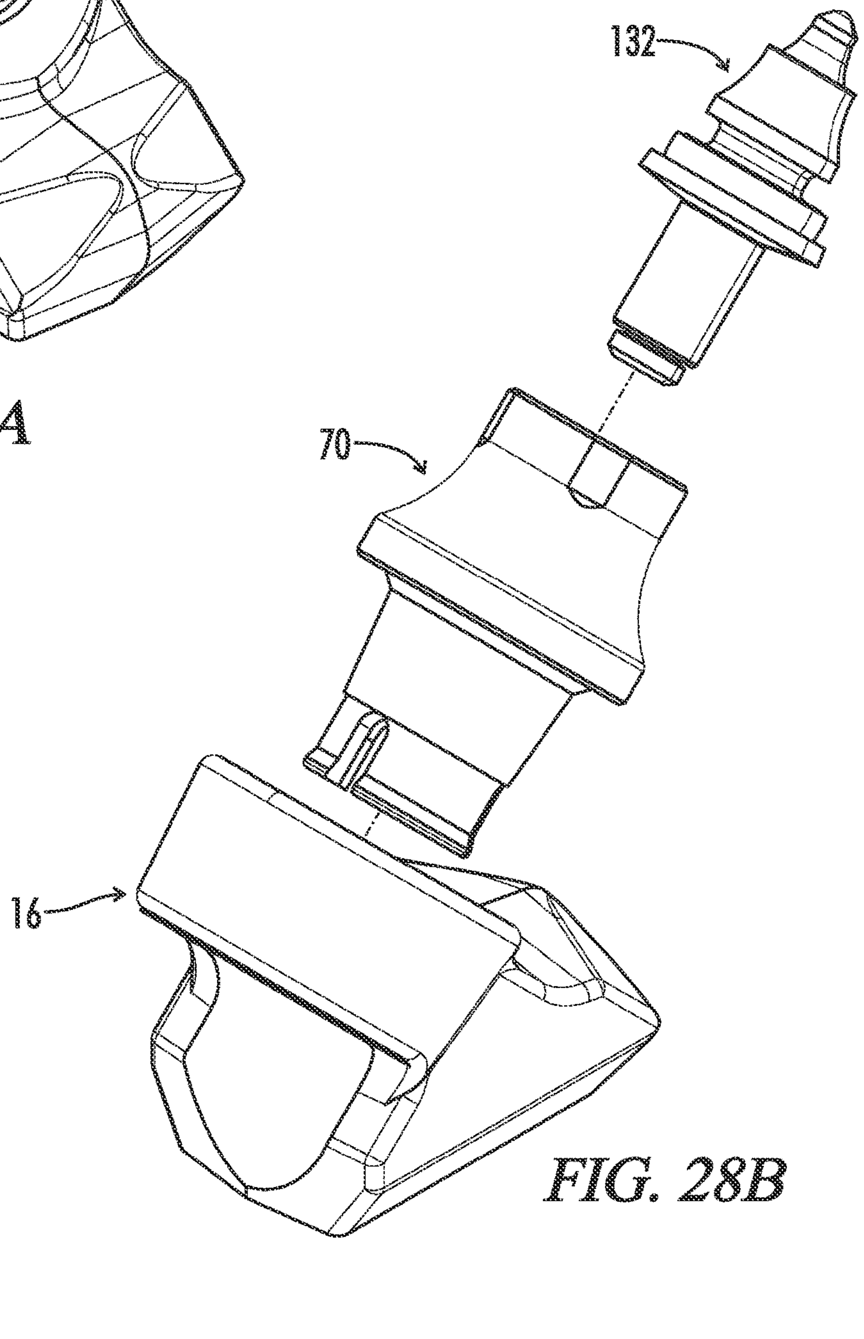
FIG. 28B illustrates an exploded perspective view of the base of FIG. 20 and the sleeve of FIG. 25A and a bit.

As best seen in FIGS. 6 and 18, the base upper portion opening 64 may comprise a front end 134 adjacent the front face 42, a rear end 136 adjacent to the rear face 46, and a varying inner diameter 66 extending across the base upper portion opening 64, and the varying inner diameter 66 may be largest at the front end 134. As best seen in FIGS. 6 and 18, the base upper portion opening 64 may further comprise a tapered front section 135 in which the inner diameter 66 of the base upper portion opening 64 tapers in decreasing size rearwardly from the base upper portion opening front end 134. As best seen in FIGS. 6 and 18, the base upper portion opening 64 may also comprise a tapered rear section 137 in which the inner diameter 66 of the base upper portion opening 64 tapers in decreasing size forwardly from the base upper portion rear end 136. As best seen in FIGS. 6 and 18, the base upper portion inner diameter 66 may be larger at the tapered front and rear sections 135 and 137 than the area between the tapered front and rear sections 135 and 137.

The sleeve (also known as a bit holder) 70 may be generally cylindrical and may include a head 72 having a front end 74, a rear end 76 that may be generally flat, a length 78 extending from the front end 74 to the rear end 76, a head diameter 80, and an exterior surface 82. The sleeve 70 may also include a shank 84 extending rearwardly from the head rear end 76. The shank 84 may include a shank front end 86 adjacent to the head rear end 76, a shank rear end 88, and a length 90 extending from the shank front end 86 to the shank rear end 88, an outer diameter 92, and an exterior surface 94.

The sleeve 70 may also include a sleeve hole 100 passing through the sleeve head 72 and sleeve shank 84 to form a hollow sleeve interior 102 that receives the milling bit 132. The hollow sleeve interior 102 may include a sleeve interior surface 104 and a sleeve inner diameter 106. The sleeve shank 84 may be configured to be removably inserted into the base upper portion opening 64 and, when inserted, may abut the interior wall 62

The shank 84 may also include a deflectable rear section 88A that may be located at the shank rear end 88 and that may include one or more flanges 96, and/or deflectable slot tails slots 98. More particularly, as shown in the embodiments depicted in FIGS. 1-28B, the deflectable rear section 88A may comprise a plurality of deflectable slot tails 99 separated by a plurality of slots 98. Each slot tail 99 may comprise a portion of the flange 96.

To lock the sleeve 70 into the base upper portion opening 64, the deflectable rear section 88A may be configured to deflect inwardly from a relaxed position to a constricted position as the sleeve shank rear end 88 is inserted into the front end 134 of the base upper portion opening 64. The deflectable rear section 88A may be configured to move outwardly and at least partially return to the relaxed position after the sleeve shank rear end 88 exits the rear end 136 of the base upper portion opening 64. In other words, the sleeve 70 may be secured to the base 16 by inserting the sleeve shank rear end 88 into the front end 134 of the generally cylindrical base upper portion opening 64 and then out the rear end 136 of the base upper portion opening 64 (i.e., moving the sleeve shank rear end 88 rearwardly through the base upper portion opening 64). The deflectable rear section 88A may move from the relaxed position to the constricted position as the sleeve shank rear end 88 is inserted into the front end 134 of the base upper portion opening 64. The deflectable rear section 88A may at least partially return to the relaxed position as the sleeve shank rear end 88 exits the rear end 136 of the base upper portion opening 64.

The flange 96 may protrude outwardly as compared to an indented section of the shank 84 immediately forward of the flange 96. The indented section may include a recess 138. The flange 96 may be located rearwardly relative to the base upper portion opening 64. The flange 96 may extend at least partially around a circumference of the deflectable rear section 88A. The plurality of slots 98 may interrupt the flange 96. Optionally, except for where the plurality of slots 98 interrupt the flange 96, the flange 96 may form a rim and extend completely around a circumference of the deflectable rear section 88A. The sleeve shank outer diameter 92 at the flange 96 may be greater than the base upper portion opening inner diameter 66 at the base upper portion opening rear end 136. The flange 96 may be configured to engage the base upper portion rear face 46 and inhibits the sleeve shank rear end 88 from moving through the base upper portion opening rear end 136.

Each slot tail 99 may have a free rear end. The plurality of slots 98 may extend from the shank exterior surface 94 to the sleeve interior surface 104. The plurality of slots 98 may be arch-shaped. Each of the plurality of slots 98 may have a width 101 parallel to the outer diameter 92 and the slot width 101 may increase at the rear end of the shank 84. The one or more slots 98 may have a slot front end 98A, a slot rear end 98B located at the shank rear end 88, and a length 98C extending from the slot front end 98A to the slot rear end 98B.

Figure 3:
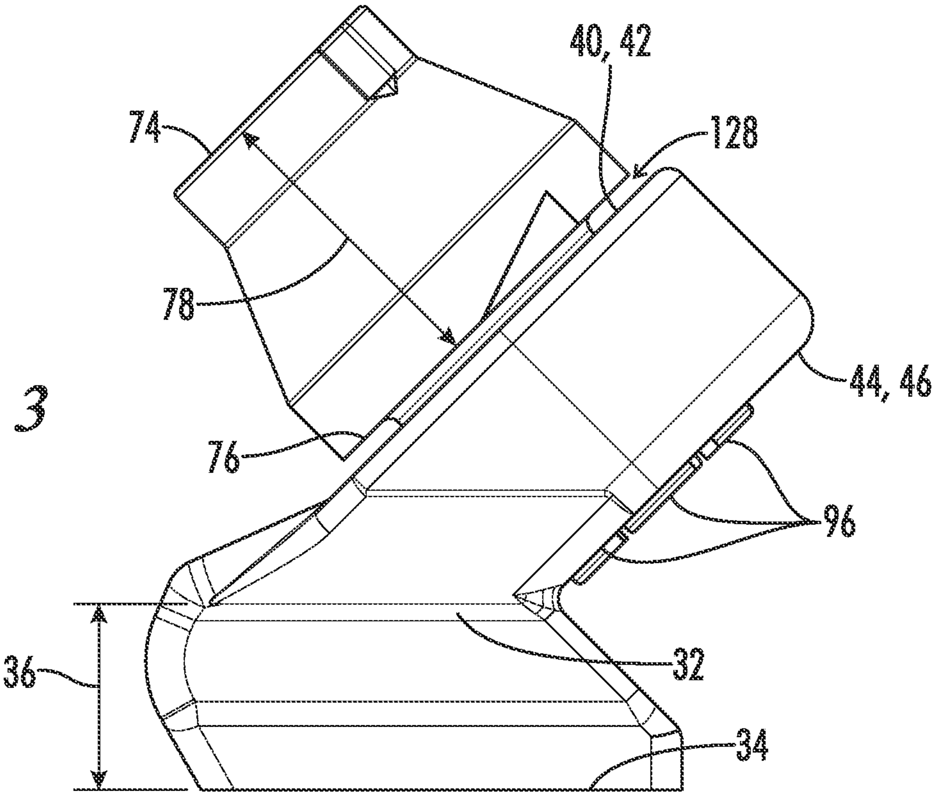
FIG. 3 illustrates a side elevation view of the milling tool of FIG. 1.
Figure 4:
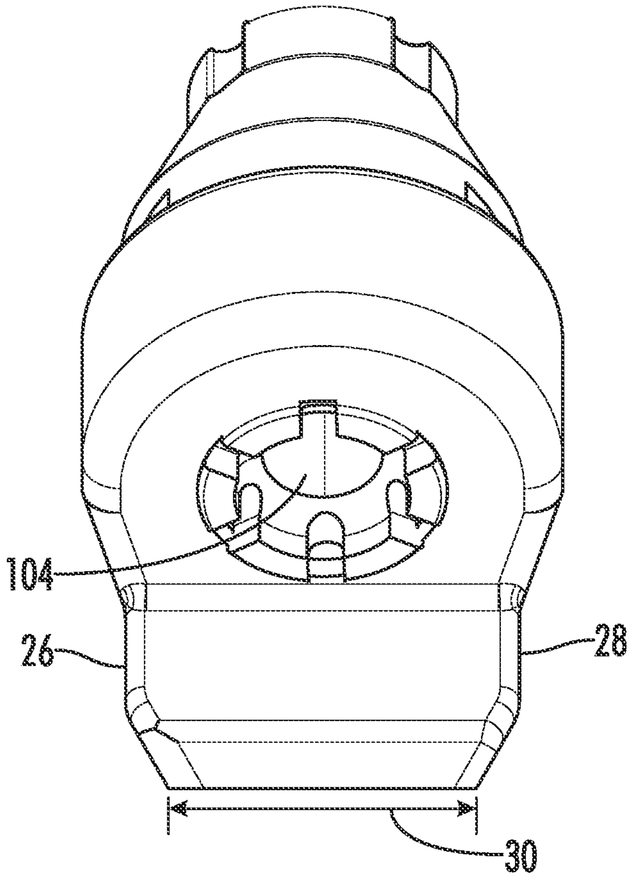
FIG. 4 illustrates a rear elevation view of the milling tool of FIG. 1.
Figure 5:
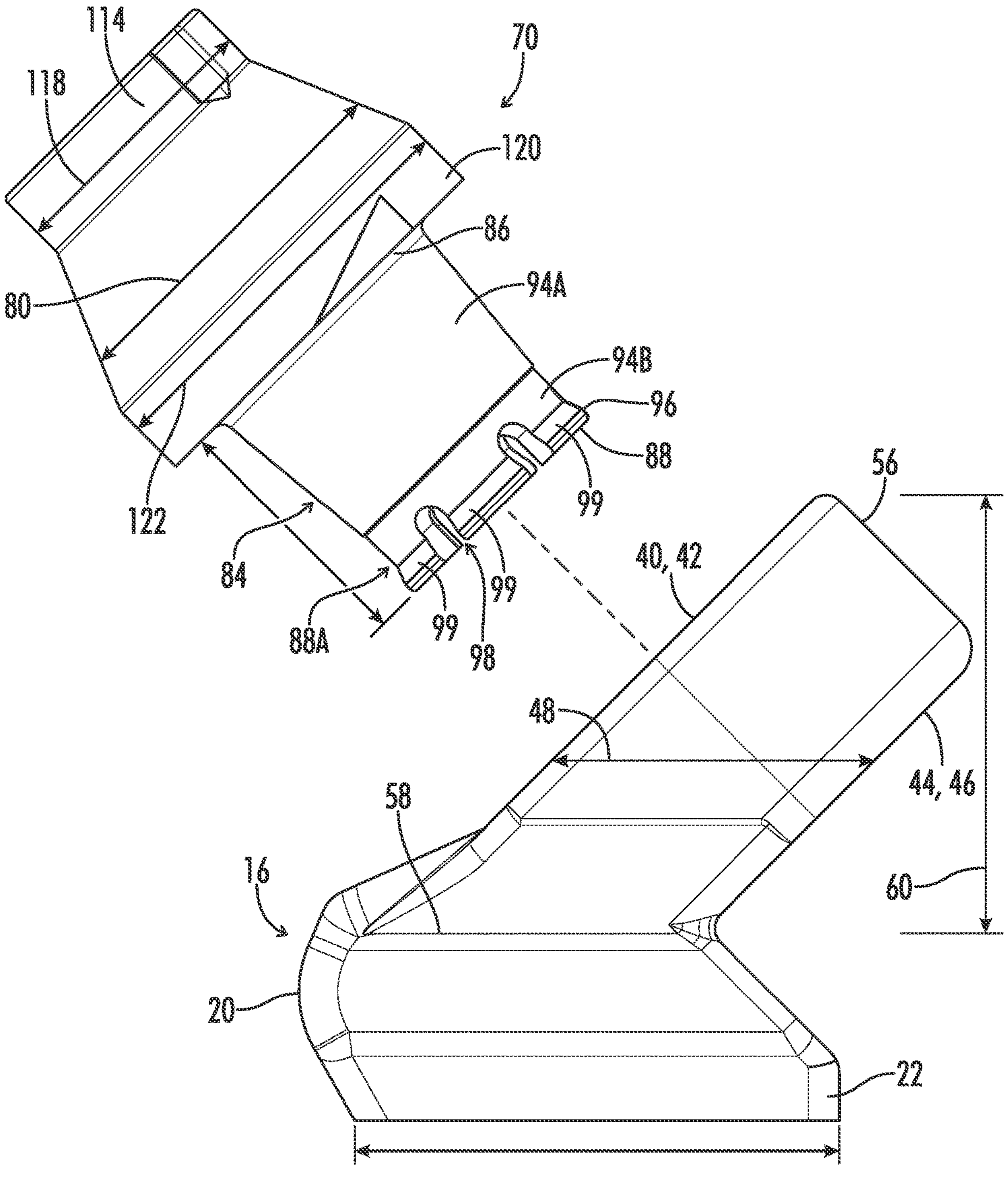
FIG. 5 illustrates a side plan view of the milling tool of FIG. 1.
Figure 12:
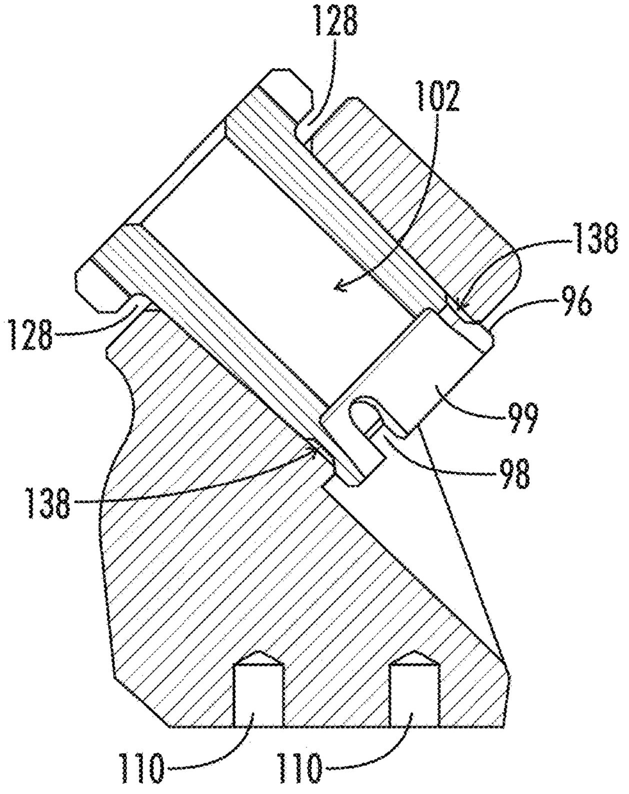
FIG. 12 illustrates a side plan cross sectional view of the milling tool of FIG. 10.
Figure 13:
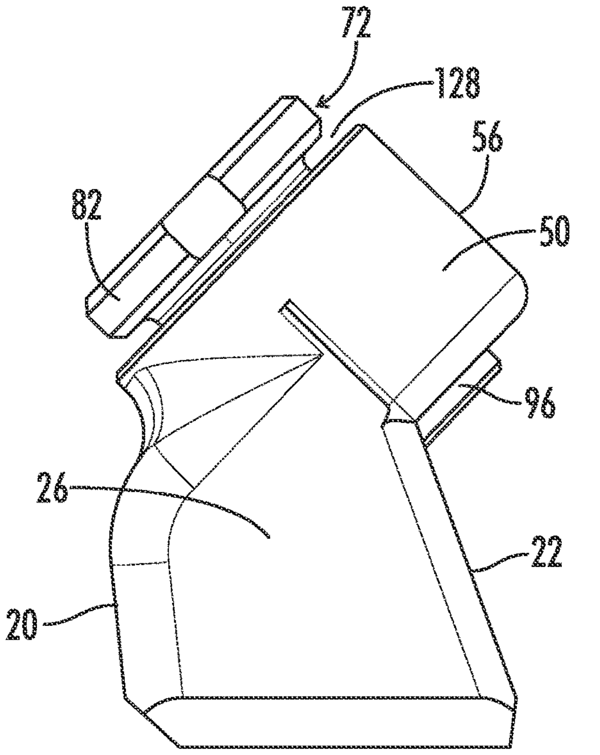
FIG. 13 illustrates a side plan view of the milling tool of FIG. 10.
Figure 14:
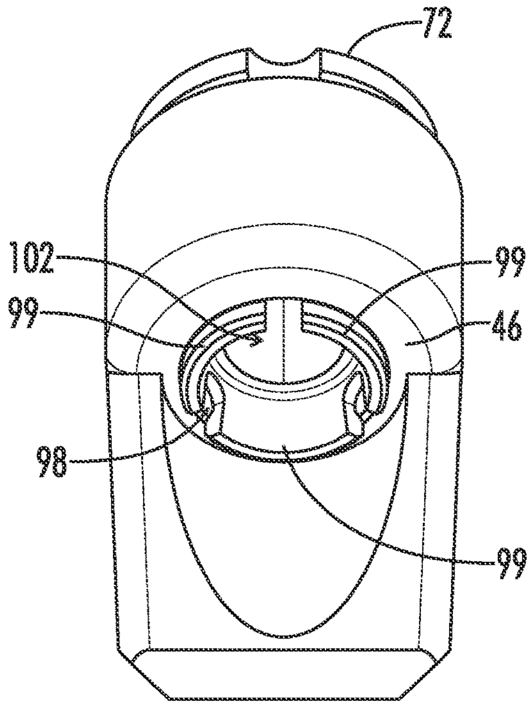
FIG. 14 illustrates a rear elevation view of the milling tool of FIG. 10.
Figure 15:
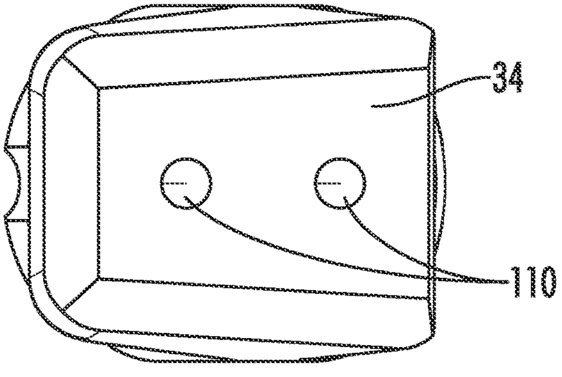
FIG. 15 illustrates a bottom plan view of the milling tool of FIG. 10.
Figure 16:
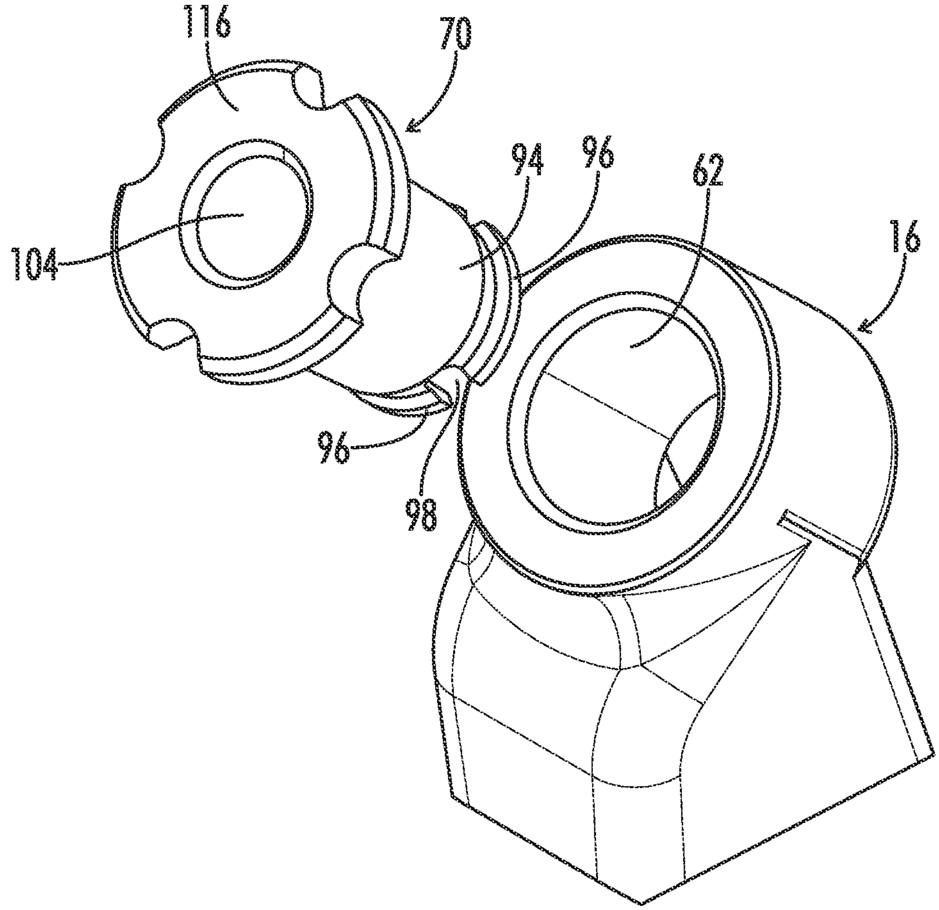
FIG. 16 illustrates a illustrates a front top side perspective view of the milling tool of FIG. 10.
Figure 17:
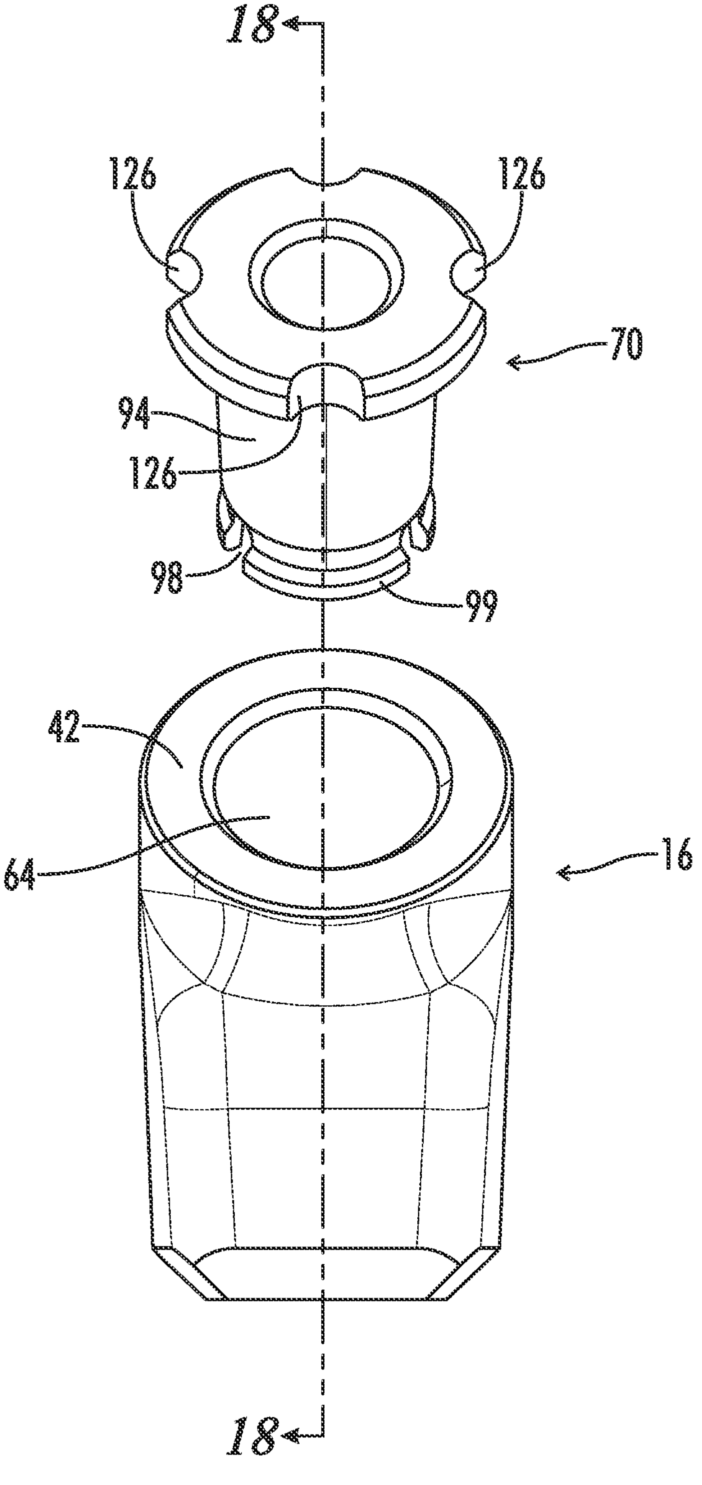
FIG. 17 illustrates a front elevation view of the milling tool of FIG. 10.

As shown in, for example, FIGS. 3, 12 and 13, when the deflectable rear section 88A at least partially returns to the relaxed position, the sleeve head 72 may be located in front of the base upper portion opening front end 134 and there may be a gap/space 128 between the sleeve head rear end 76 and the base upper portion front face 42. The space 128 may be configured to allow the sleeve head rear end 76 to move toward and/or away from the base upper portion front face 42 when the milling bit 132 is milling a surface.

The sleeve head diameter 80 may be greater than the outer diameter of the portion of the sleeve shank 92 located forwardly relative to the plurality of slots 98.

The sleeve head 72 may comprise a plurality of indentations 126 spaced about a perimeter of the sleeve head 72, and the plurality of indentations 126 may extend from the front of the sleeve head 74 rearwardly. The plurality of indentations 126 may be semi-cylindrical in shape.

The sleeve 70 may be removed from the base upper portion opening 64 by placing a sleeve removal tool (e.g., a wedge-type fork) between the sleeve head 72 and the base upper portion front 40.

As shown in FIGS. 26A-26E, the flange 96 may be indented approximately half of the full length of the slot tails 99, and the plurality of slots 98 is confined to the full-length slot tails 99.

In some embodiments, the base 16, sleeve shank 84, and milling bit 132 are comprised of metal. Alternatively, the sleeve 70 can be comprised of cold forged steel.

Optionally, as shown in FIGS. 5 and 25A-26E, the heads 72 may be conical in shape and may optionally include a nose 114.

Referring to FIGS. 27A-28B, the milling bit 132 may be secured to the sleeve 70 by inserting the milling bit 132 into the sleeve hole 100. The sleeve 70 and milling bit 132 may be then secured to the base 16 by inserting the sleeve 70 into the base upper portion opening 64. In some embodiments, the bit mounting assembly 14 may be then secured to the drum 10 by placing a fastener through the fastener apertures 110 and into the drum 10. Alternatively, the base lower portion 18 may be welded to a riser block 108 top surface and the riser block bottom surface is welded to the drum 10.

In some embodiments, the milling bit 132 comprises a diamond or tungsten carbide tip.

The milling tools described herein may provide several advantages. For example, in some embodiments, the exterior surface 94 of the sleeve shank 84 may be fit for fit, i.e., flush against the interior wall 62 of the base upper portion opening 64 in the base upper portion. Without being bound to any particular theory, this may prevent distortion or misalignment of the sleeve 70 once the sleeve 70 is seated in the base upper portion opening 64.

Further, there may be a small gap 128, e.g., 6 millimeters, between the sleeve head rear end 76 and the base upper portion front face 42 when the exterior surface 94 of the sleeve shank 84 is flush against the interior wall 62 of the base upper portion opening 64. When the bit mounting assembly 14 is used on a road, the road may exert a rearward force on the bit 132 and sleeve 70. The gap 128 may allow the sleeve 70 to be driven deeper into the base upper portion opening 64 by the rearward force exerted by the road. Without being bound to any particular theory, this may have a shock absorbing effect that extends the life of the bit assembly 14. Additionally, the holding power of the bit assembly 14 may increase as the sleeve 70 is driven deeper into the base upper portion opening 64.

Additionally, the sleeve 70 may be snap fit into the base 16 through the previously described action of the deflectable rear portion 88A and slot tails 99. Without being bound to any particular theory, the sleeve 70 being snap fit in the base upper portion opening 64 may serve to initially secure the sleeve 70 into the base 16. As the sleeve shank 84 and the base upper portion interior wall 62 wear down with use and the sleeve 70 drives deeper into the base upper portion opening 64, the sleeve shank flange 96 may disengage from the base upper portion rear 44. At this point the sleeve 70 may transition from being snap-fit in the base upper portion opening 64 to being interference fit in the base upper portion opening 64. As the sleeve shank 84 and the base upper portion interior wall 62 wear further, the shank flange 84 may reengage the base upper portion rear 44 to prevent the sleeve from ejecting from the base upper portion opening 64 if the interference fit fails.

Current tool systems may require several hits with steel hammers to install the sleeve into the base. Hitting the steel hammer against the steel or other metal of the tool system during installation may be unsafe. The design described herein preferably allows a user to install the sleeve into the base of the tool system using a rubber dead blow hammer or similar tool.

This discussion is only intended to provide examples of the advantages of the present design. It is not intended to be exclusive of other advantages or limiting on the scope of the claims.

| Parts List | |
|---|---|
| Drum | 10 |
| Drum Exterior Surface | 12 |
| Bit Mounting Assembly | 14 |
| Base | 16 |
| Base Lower Portion | 18 |
| Base Lower Portion Front | 20 |
| Base Lower Portion Rear | 22 |
| Base Lower Portion Length | 24 |
| Base Lower Portion Left Side | 26 |
| Base Lower Portion Right Side | 28 |
| Base Lower Portion Width | 30 |
| Base Lower Portion Top | 32 |
| Base Lower Portion Bottom | 34 |
| Base Lower Portion Height | 36 |
| Base Upper Portion | 38 |
| Base Upper Portion Front | 40 |
| Base Upper Portion Front Face | 42 |
| Base Upper Portion Rear | 44 |
| Base Upper Portion Rear Face | 46 |
| Base Upper Portion Length | 48 |
| Base Upper Portion Left Side | 50 |
| Base Upper Portion Right Side | 52 |
| Base Upper Portion Width | 54 |
| Base Upper Portion Top | 56 |
| Base Upper Portion Bottom | 58 |

-continued

| Parts List | |
|---|---|
| Base Upper Portion Height | 60 |
| Base Upper Portion Interior Wall | 62 |
| Base Upper Portion Opening | 64 |
| Base Upper Portion Opening Inner Diameter | 66 |
| Sleeve | 70 |
| Sleeve Head | 72 |
| Sleeve Head Front End | 74 |
| Sleeve Head Rear End | 76 |
| Sleeve Head Length | 78 |
| Sleeve Head Diameter | 80 |
| Sleeve Head Exterior Surface | 82 |
| Sleeve Shank | 84 |
| Sleeve Shank Front End | 86 |
| Sleeve Shank Rear End | 88 |
| Deflectable Rear Section | 88A |
| Sleeve Shank Length | 90 |
| Sleeve Shank Outer Diameter | 92 |
| Sleeve Shank Exterior Surface | 94 |
| Sleeve Shank Exterior Surface Forward Section | 94A |
| Sleeve Shank Exterior Surface Middle Section | 94B |
| Sleeve Shank Flange | 96 |
| Plurality of Slots | 98 |
| Slot Front End | 98A |
| Slot Rear End | 98B |
| Slot Length | 98C |
| Plurality of Slot Tails | 99 |
| Sleeve Hole | 100 |
| Slot Width | 101 |
| Sleeve Interior | 102 |
| Sleeve Interior Surface | 104 |
| Sleeve Inner Diameter | 106 |
| Riser Block | 108 |
| Fastener Aperture | 110 |
| Sleeve Head Nose | 114 |
| Sleeve Head Nose Front Face | 116 |
| Sleeve Head Nose Outer Diameter | 118 |
| Sleeve Head Base | 120 |
| Sleeve Head Base Diameter | 122 |
| Sleeve Head Base Rear Face | 124 |
| Plurality of Sleeve Head Indentions | 126 |
| Gap between Sleeve and Base | 128 |
| Milling/Cutting Bit | 132 |
| Base Upper Portion Opening Front End | 134 |
| Tapered Front End | 135 |
| Base Upper Portion Opening Rear End | 136 |
| Tapered Rear End | 137 |

Having now described the invention in accordance with the requirements of the patent statutes, those skilled in the art will understand how to make changes and modifications to the disclosed embodiments to meet their specific requirements or conditions. It is understood that use of the singular embraces the plural and vice versa. Changes and modifications may be made without departing from the scope and spirit of the invention. In addition, the steps of any method described herein may be performed in any suitable order and steps may be performed simultaneously if needed.

Terms of degree such as “generally”, “substantially”, “about” and “approximately” as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A method for milling a surface comprising the steps of:

a) providing a base comprising:

i) a base lower portion comprising a front, a rear, a length extending from the front to the rear, and a width extending perpendicular to the length; and ii) a base upper portion extending from the base lower portion and comprising a front comprising a front face, a rear comprising a rear face, a length extending from the front to the rear and parallel to the base lower portion length, a width parallel to the base lower portion width, and an interior wall forming a base upper portion opening extending through the base upper portion from the front face to the rear face, the base upper portion opening comprising a front end adjacent the front face, a rear end adjacent the rear face, and an inner diameter extending across the base upper portion opening;

b) providing a sleeve comprising a forward direction and a rearward direction, the sleeve further comprising:

i) a head comprising a front end, a rear end located in a rearward direction from the front end, a length extending from the front end to the rear end, a head diameter, and an exterior surface;

ii) a shank extending in the rearward direction from the head rear end, the shank comprising a shank front end adjacent to the head rear end, a shank rear end located in the rearward direction from the shank front end, a length extending from the shank front end to the shank rear end, an outer diameter, an exterior surface, and a deflectable rear section located at the shank rear end, the deflectable rear section comprising one or more slots, the one or more slots having a slot front end, a slot rear end located at the shank rear end, and a length extending from the slot front end to the slot rear end;

iii) a sleeve hole passing through the head and shank of the sleeve to form a hollow sleeve interior, the hollow sleeve interior comprising a sleeve interior surface and a sleeve inner diameter;

wherein the sleeve shank is configured to be removably inserted into the base upper portion opening;

wherein the deflectable rear section is configured to deflect inwardly from a relaxed position to a constricted position as the rear end of the sleeve shank is inserted into the front end of the base upper portion opening;

wherein the deflectable rear section is configured to move outwardly and at least partially return to the relaxed position after the rear end of the sleeve shank exits the rear end of the base upper portion opening;

c) securing the sleeve shank to the base by inserting the rear end of the sleeve shank into the front end of the base upper portion opening and then out of the rear end of the base upper portion opening, wherein the deflectable rear section moves from the relaxed position to the constricted position as the rear end of the sleeve shank is inserted into the front end of the base upper portion opening, wherein the deflectable rear section partially but not fully returns to the relaxed position as the rear end of the sleeve shank exits the rear end of the base upper portion opening, and further wherein the sleeve is interference fit into the base upper portion opening;

d) securing a milling bit to the sleeve by inserting the milling bit into the sleeve hole; and e) rotating the base (and the sleeve shank and the milling bit secured to the base), on a drum of a milling machine, wherein the deflectable rear section comprises a flange, the flange protruding outwardly as compared to an indented section of the shank immediately in the forward direction as compared to the flange, the indented section comprising a recess engaging the rear end of the base upper portion opening, and further wherein when the deflectable rear section partially returns to the relaxed position, the flange is located in the rearward direction relative to the base upper portion opening.

2. The method of claim 1, wherein, when the deflectable rear section at least partially returns to the relaxed position, the head of the sleeve is located in front of the base upper portion opening front end and there is a gap of approximately 6 millimeters between the rear end of the head of the sleeve and the base upper portion front face.

3. The method of claim 2, wherein the gap is configured to allow the sleeve head rear end to move toward and/or away from the base upper portion front face when the milling bit is milling a surface.

4. The method of claim 1, wherein the base upper portion opening comprises a tapered front section in which the inner diameter of the base upper portion opening tapers in decreasing size from the base upper portion opening front end towards the base upper portion opening rear end.

5. The method of claim 4, wherein the base upper portion opening comprises a tapered rear section in which the inner diameter of the base upper portion opening tapers in decreasing size from the base upper portion opening rear end towards the base upper portion opening front end.

* * * * *